(12) United States Patent
Zagrodnik et al.

(10) Patent No.: US 11,799,162 B2
(45) Date of Patent: Oct. 24, 2023

(54) LIGHT WEIGHT THERMAL RUNAWAY AND EXPLOSION RESISTANT AEROSPACE BATTERY

(71) Applicants: Rolls-Royce Singapore Pte. Ltd., Singapore (SG); Rolls-Royce plc, London (GB)

(72) Inventors: Michael Adam Zagrodnik, Singapore (SG); Teh Yee Siang, Singapore (SG); Mathivanan Anand Prabhu, Singapore (SG); Krishnamoorthi Sivalingam, Singapore (SG); Stephen Mountain, London (GB)

(73) Assignees: Rolls-Royce Singapore Pte. Ltd., Singapore (SG); Rolls-Royce plc, London (GB)

( * ) Notice: Subject to any disclaimer, the term of this patent is extended or adjusted under 35 U.S.C. 154(b) by 8 days.

(21) Appl. No.: 17/405,894

(22) Filed: Aug. 18, 2021

(65) Prior Publication Data

US 2023/0059778 A1 Feb. 23, 2023

(51) Int. Cl.
*H01M 50/249* (2021.01)
*H01M 10/6557* (2014.01)
(Continued)

(52) U.S. Cl.
CPC ....... *H01M 50/249* (2021.01); *H01M 10/425* (2013.01); *H01M 10/613* (2015.04);
(Continued)

(58) Field of Classification Search
CPC ............. H01M 50/249; H01M 10/425; H01M 10/613; H01M 10/6554; H01M 10/6557;
(Continued)

(56) References Cited

U.S. PATENT DOCUMENTS

| 8,142,920 B2 | 3/2012 | Hennige et al. |
| 8,343,650 B2 | 1/2013 | Raiser |

(Continued)

FOREIGN PATENT DOCUMENTS

JP 4653753 B2 3/2011

OTHER PUBLICATIONS

Kalnaus et al., "Effect of packaging and cooling plates on mechanical response and failure characteristics of automotive Li-ion battery modules", Journal of Power Sources, Sep. 14, 2018, 26 pgs.

(Continued)

*Primary Examiner* — Stewart A Fraser
(74) *Attorney, Agent, or Firm* — Shumaker & Sieffert, P.A.

(57) ABSTRACT

An aerospace battery may include a housing, a retaining seat disposed in the housing, and a battery pack core supported by the retaining seat in the housing. The battery pack core may include at least one cell district comprising a plurality of pouch cell batteries and at least one flexible cold plate disposed between at least two adjacent pouch cell batteries of the plurality of pouch cell batteries. The retaining seat may define a fluid delivery channel configured to couple to an inlet of a cooling channel of the flexible cold plate and a fluid return channel configured to couple to an outlet of the cooling channel of the flexible cold plate.

20 Claims, 19 Drawing Sheets

(51) Int. Cl.
    *H01M 10/613* (2014.01)
    *H01M 50/211* (2021.01)
    *H01M 10/42* (2006.01)
    *H01M 50/502* (2021.01)
    *H01M 10/6554* (2014.01)
    *B33Y 80/00* (2015.01)

(52) U.S. Cl.
    CPC ... *H01M 10/6554* (2015.04); *H01M 10/6557* (2015.04); *H01M 50/211* (2021.01); *H01M 50/502* (2021.01); *B33Y 80/00* (2014.12); *H01M 2010/4271* (2013.01); *H01M 2220/20* (2013.01)

(58) Field of Classification Search
    CPC ............. H01M 50/211; H01M 50/502; H01M 2010/4271; H01M 2220/20
    See application file for complete search history.

(56) References Cited

U.S. PATENT DOCUMENTS

| | | | |
|---|---|---|---|
| 10,510,999 B2* | 12/2019 | Yoo | H01M 50/211 |
| 2015/0200428 A1* | 7/2015 | Pekarsky | H01M 10/647 429/120 |
| 2018/0175468 A1* | 6/2018 | Shin | H01M 10/6556 |
| 2018/0223070 A1* | 8/2018 | O'Neil | H01M 10/6557 |
| 2019/0221905 A1* | 7/2019 | Shimizu | H01M 10/6557 |
| 2019/0355954 A1* | 11/2019 | Dawley | H01M 50/105 |
| 2020/0076024 A1* | 3/2020 | Kalmbach | H01M 10/625 |
| 2021/0057708 A1* | 2/2021 | Castillo | H01M 10/647 |
| 2022/0158273 A1* | 5/2022 | Razack | H01M 10/617 |
| 2022/0285753 A1* | 9/2022 | Rainville | B64D 33/08 |
| 2022/0328918 A1* | 10/2022 | Pitre | H01M 50/233 |
| 2023/0054839 A1 | 2/2023 | Zagrodnik et al. | |

OTHER PUBLICATIONS

EV Battery Foams extend the battery pack life—Saint-Gobain, Retrieved from https://www.tapesolutions.saint-gobain.com/resources/technical-articles/ on Aug. 17, 2021, 4 pgs.

* cited by examiner

LIGHT WEIGHT THERMAL RUNAWAY AND EXPLOSION RESISTANT AEROSPACE BATTERY

TECHNICAL FIELD

This disclosure relates to the design an aerospace battery.

BACKGROUND

Aerospace batteries may store electrical energy for electrical system use, including instrumentation and control, in-cabin services, and/or propulsion systems. Electrical energy storage needs are increasing as airplanes provide additional in-cabin entertainment, transition from hydraulic to electrical control systems, transition to hybrid or electrical propulsion systems, or a combination thereof.

SUMMARY

In some examples, the disclosure describes an aerospace battery comprising: a housing; a battery pack core disposed in the housing, wherein the battery pack core comprises: a district comprising a plurality of pouch cell batteries; and a ceramic jacket surrounding the district; and a closed cell foam disposed in the housing, wherein at least a portion of the closed cell foam is disposed between the battery pack core and the housing.

In some examples, the disclosure describes a method comprising: inserting a battery pack core within a housing of an aerospace battery, wherein the battery pack core comprises: a district comprising a plurality of pouch cell batteries; and a ceramic jacket surrounding the district; and reactive molding a closed cell foam within the housing around the battery pack core, wherein the closed cell foam fills substantially all the space between the housing and the battery pack core.

In some examples, the disclosure describes an aerospace battery: a housing; a retaining seat disposed in the housing; a battery pack core supported by the retaining seat, wherein the battery pack core comprises at least one district comprising: a plurality of pouch cell batteries; and a flexible cold plate disposed between at least two adjacent pouch cell batteries of the plurality of pouch cell batteries, wherein the flexible cold plate defines a cooling channel having an inlet and an outlet; wherein the retaining seat defines a fluid delivery channel configured to couple to the inlet of the cooling channel of the flexible cold plate and a fluid return channel configured to couple to the outlet of the cooling channel of the flexible cold plate.

In some examples, the disclosure describes and aerospace battery, comprising: a housing; a plurality of retaining seats disposed in the housing; a plurality of battery pack cores, each supported by a respective retaining seat, wherein each battery pack core comprises a plurality of districts, each comprising: a plurality of pouch cell batteries; and a flexible cold plate disposed between at least two adjacent pouch cell batteries of the plurality of pouch cell batteries, wherein the flexible cold plate defines a cooling channel having an inlet and an outlet; wherein each retaining seat defines a fluid delivery channel configured to couple to the inlet of the cooling channel of the flexible cold plate and a fluid return channel configured to couple to the outlet of the cooling channel of the flexible cold plate.

In some examples, the disclosure describes a method comprising: inserting a battery pack core into a retaining seat, wherein the retaining seat defines a fluid delivery channel and a fluid return channel, and wherein the battery pack core comprises at least one district comprising: a plurality of pouch cell batteries; and a flexible cold plate disposed between at least two adjacent pouch cell batteries of the plurality of pouch cell batteries, wherein the flexible cold plate defines a cooling channel having an inlet and an outlet, and fluidly coupling the inlet of the cooling channel of the flexible cold plate to the fluid delivery channel of the retaining seat; and fluidly coupling the outlet of the cooling channel of the flexible cold plate to the fluid return channel of the retaining seat.

The details of one or more examples are set forth in the accompanying drawings and the description below. Other features, objects, and advantages will be apparent from the description and drawings, and from the claims.

DETAILED DESCRIPTION

Batteries, such as lithium ion batteries, often include multiple battery cells electrically connected together and housed in a single housing. Each battery cell of a battery is connected so that the battery outputs electrical power at a selected voltage and a selected power capacity. Each battery cell includes an anode, a cathode, an electrolyte, and components housed in a battery cell housing. Some of the components of a battery cell may be flammable or combustible. During operation, should a spark or short circuit occur in one of the cells, one or more components of the battery cell may burn, and the fire may spread to other battery cells of the battery. Should the thermal event burn in an uncontrolled matter, the fire may escape the battery housing and/or the battery may explode.

In accordance with techniques described herein, a battery for aerospace applications may include one or more features configured to reduce or substantially eliminate risk of a thermal event, such as uncontrolled fires and/or explosion. For example, the battery housing, a fill material in the interior of the battery housing, an arrangement of cells in the battery housing, and/or an arrangement of cold plates in the battery housing may include one or more features that reduce or substantially eliminate risk of a thermal event.

In some examples, battery cells may include pouch cells. A pouch cell housing may include a flexible material, such as a metalized polymer. The flexible material of a pouch cell housing may reduce the weight of the cell compared to an equivalent cell having a metal housing. During operation, a pouch cell may swell. Pouch cells that are constrained, for example, due to swelling during operation, may have increased heat retention and/or reduced performance.

In accordance with techniques described herein, a battery for aerospace applications that includes a plurality of pouch cells may include one or more retaining seats configured to support individual pouch cells and/or groupings of pouch cells (e.g., districts). Additionally, the retaining seat may be configured to support one or more flexible cold plates adjacent to one or more pouch cells and, optionally, fluidly couple the flexible cold plates to a cooling fluid circuit. During operation, the retaining seats may allow the housing to expand or swell and, optionally, facilitate transport of a cooling fluid through the cold plates.

Figure 1:
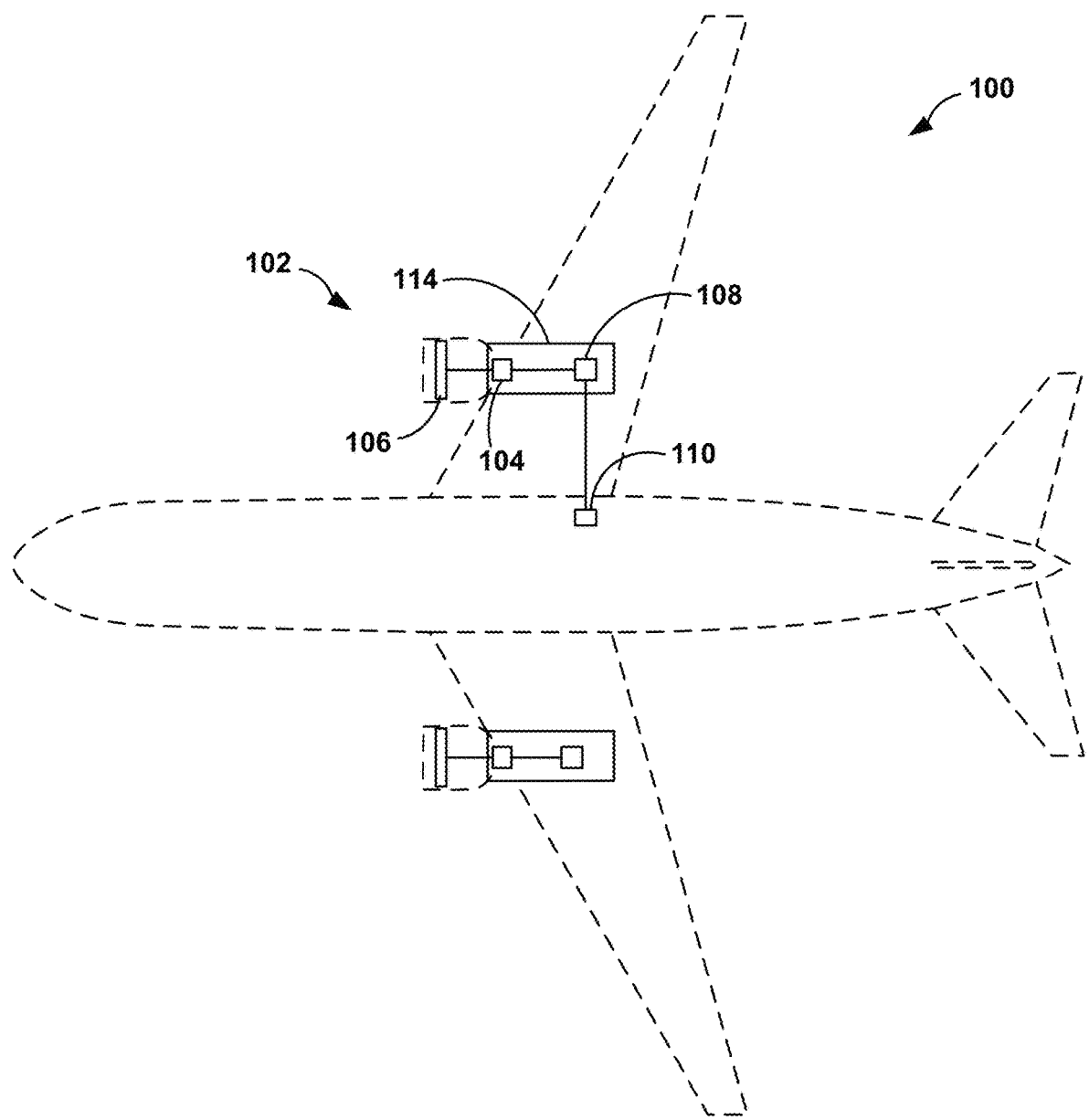
FIG. 1 is a conceptual diagram of a vehicle that includes an aerospace battery, in accordance with one or more techniques of this disclosure.

FIG. 1 is a conceptual diagram of a vehicle 100 that includes an aerospace battery, in accordance with one or more techniques of this disclosure. In some examples, vehicle 100 is an aircraft. In other examples, vehicle 100 may include any type of aerospace vehicle utilizing a battery, including a fixed wing aircraft, a rotary wing aircraft, or the like. Vehicle 100 may be manned, semiautonomous, or autonomous.

As shown in the example of FIG. 1, vehicle 100 may include propulsion system 102. In some examples, propulsion system 102 may include a combustion engine, such as a gas-turbine engine 104. In some examples, gas-turbine engine 104 may be configured to drive a propulsor 106. Propulsion system 102 also includes electric generator 108 that may both start gas-turbine engine 104 and generate electrical power using mechanical energy generated by gas-turbine engine 104. Generator 108 may generate electrical energy from mechanical energy of gas turbine engine 104 and may transfer the energy to battery 110.

Battery 110 may be connected to an electrical system and provide electrical power for any one of a variety of functions of vehicle 100. For example, battery 110 may be connected to an electrical bus and provide power for in-cabin functions, such as in-cabin entertainment, lighting, and the like. As another example, battery 110 may be connected to an electrical bus and provide power for cockpit electronics. As a further example, battery 110 may be connected to an electrical bus and provide power for starting gas turbine engine 104, powering propulsor 106, or the like.

In some examples, battery 110 may include one or more features configured to reduce or substantially eliminate risk of a thermal event, such as a thermal runaway reaction, a fire, or an explosion. For example, battery 110 may include a battery housing, a fill material in the interior of the battery housing, an arrangement of cells in the battery housing, and/or an arrangement of cold plates in the battery housing that include one or more features that reduce or substantially eliminate risk of a thermal event.

In some examples, battery 110 may include one or more features configured to support cells and cold plates in an arrangement of cell districts to facilitate cooling fluid management and reduce or substantially eliminate risk of a thermal event. For example, battery 110 may include one or more retaining seats configured to support one or more corresponding districts that include a plurality of pouch cells, support one or more flexible cold plates configured to regulate a temperature of battery cells or districts, or both. During operation, the one or more retaining seats may allow the plurality of pouch cells to expand or swell. The one or more retaining seats also may, in some examples, fluidly couple (e.g., in series or in parallel) one or more flexible cold plates to a cooling fluid circuit, which may include a cooling fluid reservoir, a heat exchanger, and a pump. The cooling fluid circuit may be configured to circulate a cooling liquid, such as water, an alcohol, a glycol, or another cooling fluid, through the one or more flexible cold plates. In this way, the retaining seats may facilitate transport of a cooling fluid through the cold plates for thermal management of battery 110.

In some examples, battery 110 may include a battery housing may include a shape and construction configured to increase pressure capability of the battery housing, such that the battery housing is more capable of withstanding high internal pressures, such as those that may occur during uncontrolled fires and/or explosions within the battery housing. For instance, the battery housing may include a casing having at least one arc-shaped surface, such as a rectangular casing having an arc-shaped casing cover. The at least one arc-shaped casing cover may provide higher pressure capability than a flat casing cover of similar dimensions and wall thickness. Additionally, or alternatively, the arc-shaped casing cover may have a relatively thinner wall than a flat casing cover having a comparable pressure rating (e.g., explosion pressure protection requirement). In this way, a casing with an arc-shaped casing cover may provide a balance between pressure capability and weight of the casing. Additionally, in some examples, the arc-shaped geometry of the casing cover may be configured to direct heat and flame to a venting system in the event of a thermal runaway reaction or explosion.

In some examples, the casing include a dual layer thermal insulation material configured to protect against high temperatures that may be produced during a thermal event (e.g., a thermal runaway reaction or uncontrolled fires and/or explosions) within or outside of the battery housing. For example, a dual layer thermal insulation material may include a thin metal outer wall and an inner ceramic layer. The thin metal outer wall may include, for example, aluminum, titanium, a steel alloy, combinations thereof, or another metal for thermal protection and/or impact protection. The inner ceramic layer may include one or more substantially non-combustible materials. For example, the inner ceramic layer may include a ceramic fiber paper including, for example, alumina, silica, alumina-silicate, calcium-magnesium oxide, calcium magnesium silicate, or another ceramic.

In some examples, battery 110 may include one or more fill materials that at least partially fill otherwise empty space within the battery housing. For example, the one or more fill materials may at least partially fill space between an inner wall of the battery housing and surfaces of the battery pack core. The fill materials may be include a ceramic paper (as described above), a closed cell foam, or both. The closed cell foam may include substantially non-combustible materials.

For example, the closed cell foam may include polymer, such as a polyurethane. In some implementations, the polyurethan foam may be mixed or filled with a fire retardant. By filling otherwise empty space within the battery housing, the amount of free air in the enclosure may be reduced, which may reduce a rate at which components within the battery housing burn if ignited and reduce or substantially eliminate a risk of explosion. Additionally, the fill materials may reduce vibration transferring from the casing to the battery cells.

In some examples, battery 110 may include a plurality of districts, each district including a plurality of battery cells. Each district may be configured to reduce or substantially eliminate a risk of thermal runaway from one battery cell or district resulting in other battery cells also igniting. For example, each district may be separated from adjacent districts by at least a layer of ceramic paper and, optionally, a closed cell foam and/or a cold plate. In some examples, a ceramic paper may completely envelop a respective district.

In some examples, each district may include one or more cold plates. The cold plates also may include features that help isolate heat within regions of the cold plate. For example, the cold plate may include a flexible pouch defining at least one liquid cooling channel. One or more cold plates may be positioned between adjacent battery cells. This ensures that each battery cell is directly adjacent to a liquid cooling channel. Additionally, or alternatively, one or more cooling plates may be positioned adjacent an anode and/or a cathode of each battery cell. Cooling the anode and/or the cathode may promote more uniform cooling of the volume of the battery cell and, in some examples, increase a useable life of the battery cell.

FIGS. 2A-2E are conceptual diagrams illustrating various views of an example aerospace battery 200, in accordance with one or more techniques of this disclosure. Aerospace battery 200 includes a housing 202, an optional service compartment 204, a battery pack core 206, and closed cell foam 208.

Figure 2A:
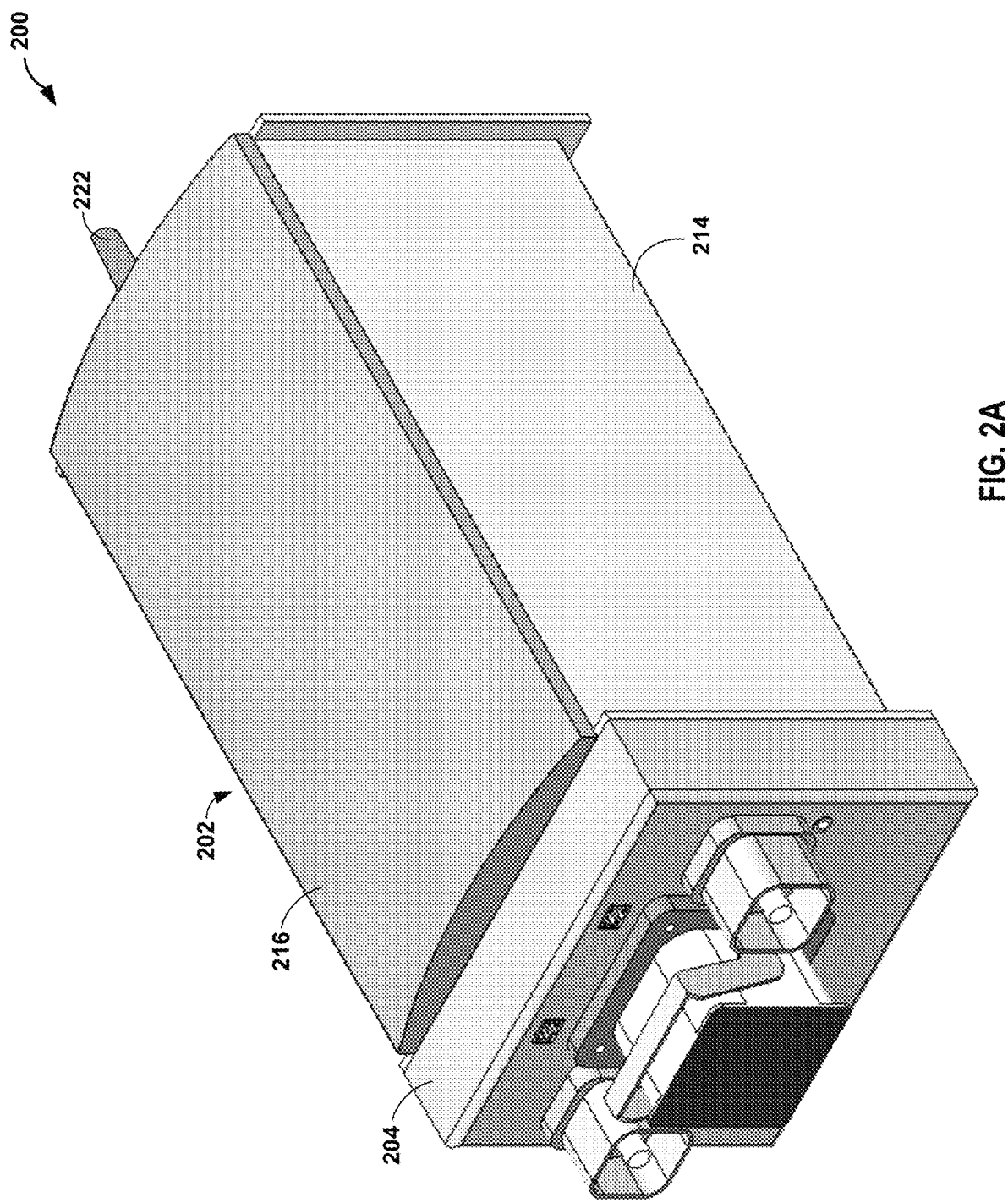
FIGS. 2A-2E are conceptual diagrams illustrating various views of an example aerospace battery, in accordance with one or more techniques of this disclosure.

As illustrated in FIG. 2A, housing 202 includes casing 214 and casing cover 216. Casing 214 may include a rectilinear structure or another shape, such as a curvilinear structure. Casing cover 216 is removably attached to casing 214. For example, casing cover 216 may be attached to casing cover 214 by one or more hinges, one or more mechanical couplings, latches, or the like. In some examples, housing 202 may include a seal between casing 214 and casing cover 216 that is configured to fluidly seal housing 202. Casing 214 and casing cover 216 may include any suitable material(s) configured to resist external impact, resist internal pressures, and/or resist heat transfer.

Figure 2B:
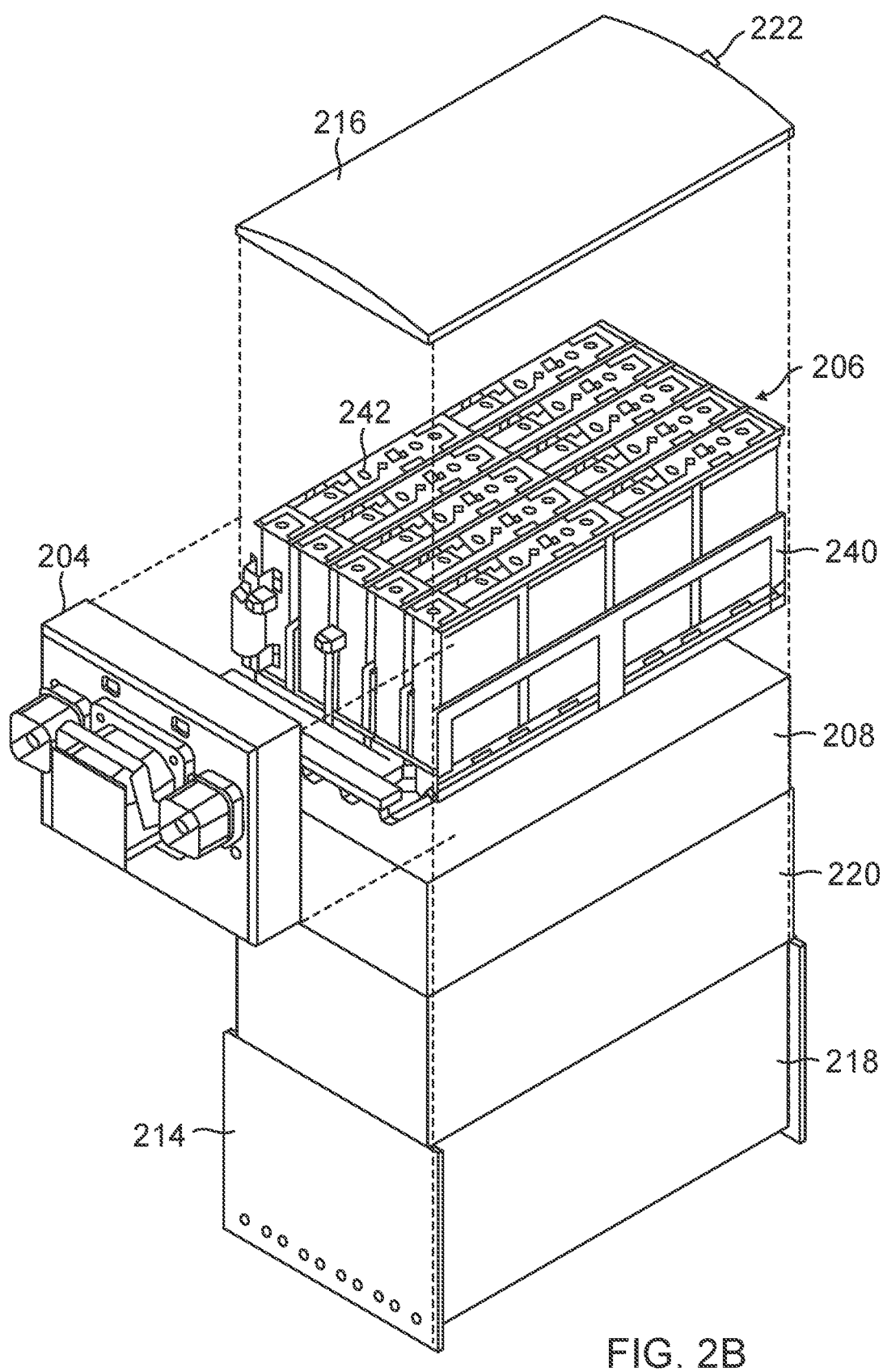
Figure 2C:
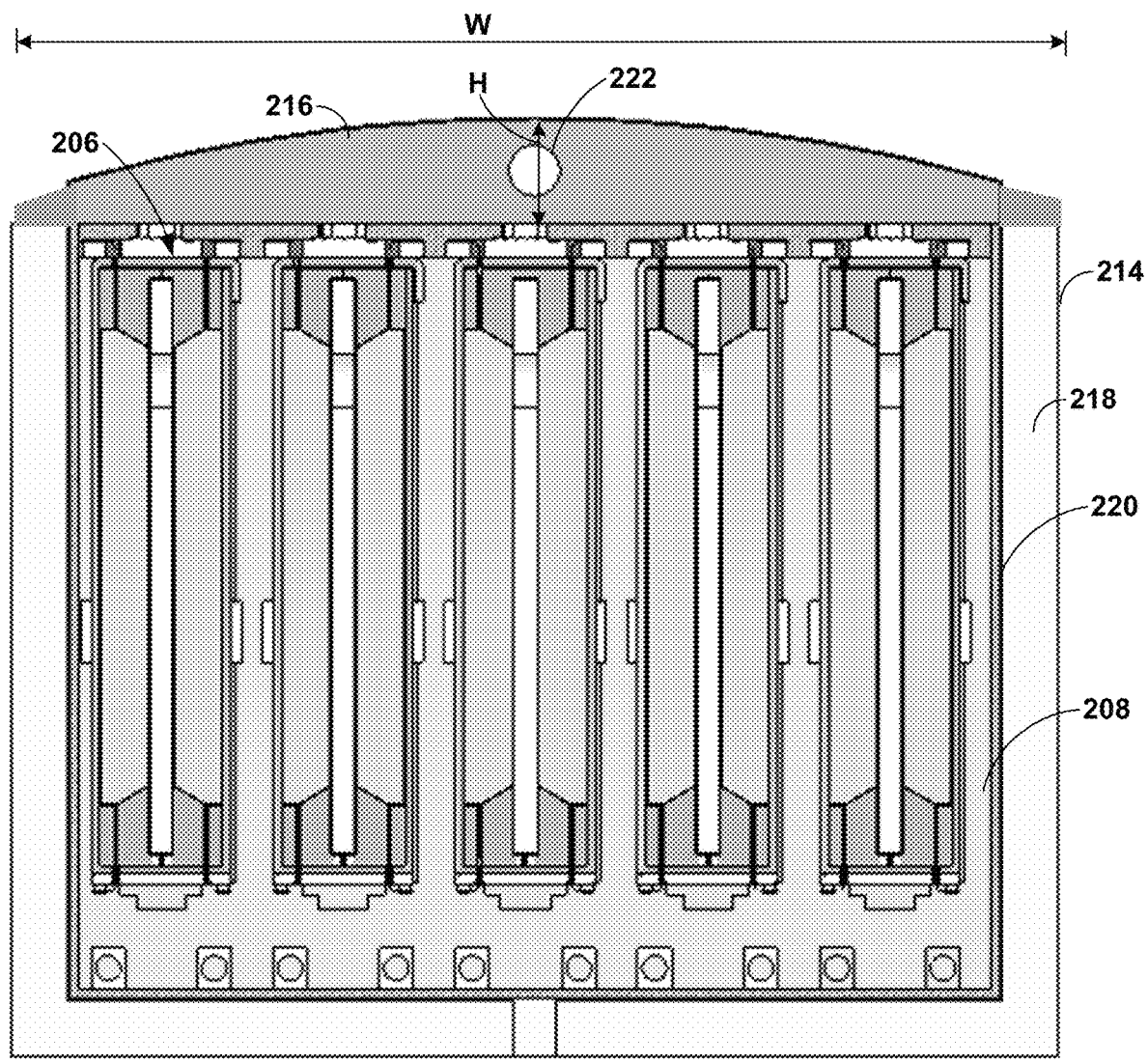

In some examples, as illustrated in FIG. 2B, casing 214 and/or casing cover 216 may include an outer layer 218 and an inner layer 220. Outer layer 218 may be configured to provide external impact resistance and resist internal pressures, such as, for example, pressure generated by fire or explosion within housing 202. Outer layer 218 may include one or more materials that have high yield stress, high temperature capability, or both. In some examples, outer layer 218 may include a metal, such as aluminum, an aluminum alloy, copper, a copper alloy, a steel alloy, titanium, a titanium alloy, combinations thereof, or another metal or alloy. Outer layer 218 may be formed from at least one sheet of material and may include edges that are joined by welding (e.g., laser welding), brazing, or the like. The thickness of outer layer 218 may be selected to resist rupture under the stress of a fire or explosion within housing 202. For example, a thickness of an aluminium-based outer layer 218 may be within a range from about 0.25 millimeters (mm) to about 1 mm, such as about 0.5 mm.

Inner layer 220 may be configured to resist heat transfer from an interior of housing 202 to an exterior of housing 202, or vice versa. For example, inner layer 220 may include a refractory material, a ceramic material, or a ceramic fiber paper. Example ceramics suitable for inner layer 220 may include, but are not limited to, alumina, silica, alumina-silicate, calcium-magnesium oxide, or calcium magnesium silicate. An example ceramic material may include, but is not limited to, FyreWrap®, available from Unifrax, Tonawanda, N.Y. In some examples, inner layer 220 may be laminated to outer layer 218, such as, for example, using an adhesive. In some examples, casing 214 and/or casing cover 216 may include a plurality of layers, such as a first layer including a metal or alloy, a second layer including a ceramic paper, a third layer including a metal or alloy, and a fourth layer including a ceramic paper.

In some examples, casing cover 216 may define an arc-shaped casing cover, such as a horizontal cylindrical segment tracing an arc in one axis (e.g., FIG. 2C) or a dome shape tracing arcs in two axes. For example, as illustrated in the cross-sectional view of FIG. 2C, a ratio of a width W of casing cover 216 to a height H (e.g., near a center of the width) of casing cover 216 may be within a range from about 4 to about 6, such as about 5. The arc-shaped shape and materials of casing cover 216 may be configured to withstand an explosion pressure of at least about 5 bar (500 kilo-Pascal (kPa), such as at least about 10 bar (1000 kPa). For example, similar to casing 214, casing cover 216 may include an outer layer, such as aluminum alloy, and an inner layer, such as a ceramic paper. As one example, an arc-shaped casing cover 216 including an outer layer of 0.5 mm thick aluminum alloy with a density of 2770 kilograms per cubic meter ($kg/m^3$), a Young's modulus of about 71 giga-Pascal (GPa), a yield strength of about 250 mega-Pascal (MPa), and an ultimate yield strength of about 310 MPa may resist breach under a maximum von Mises stress of about 199 MPa after an explosion in housing 202. In this way, casing cover 216 may be configured to resist breach under explosion pressure of a faulty lithium ion battery. Moreover, an arc-shaped casing cover 216 may include less material, and thereby a reduced weight, relative to a flat or planar casing cover having a similar resistance to breach under an explosion.

Figure 2D:
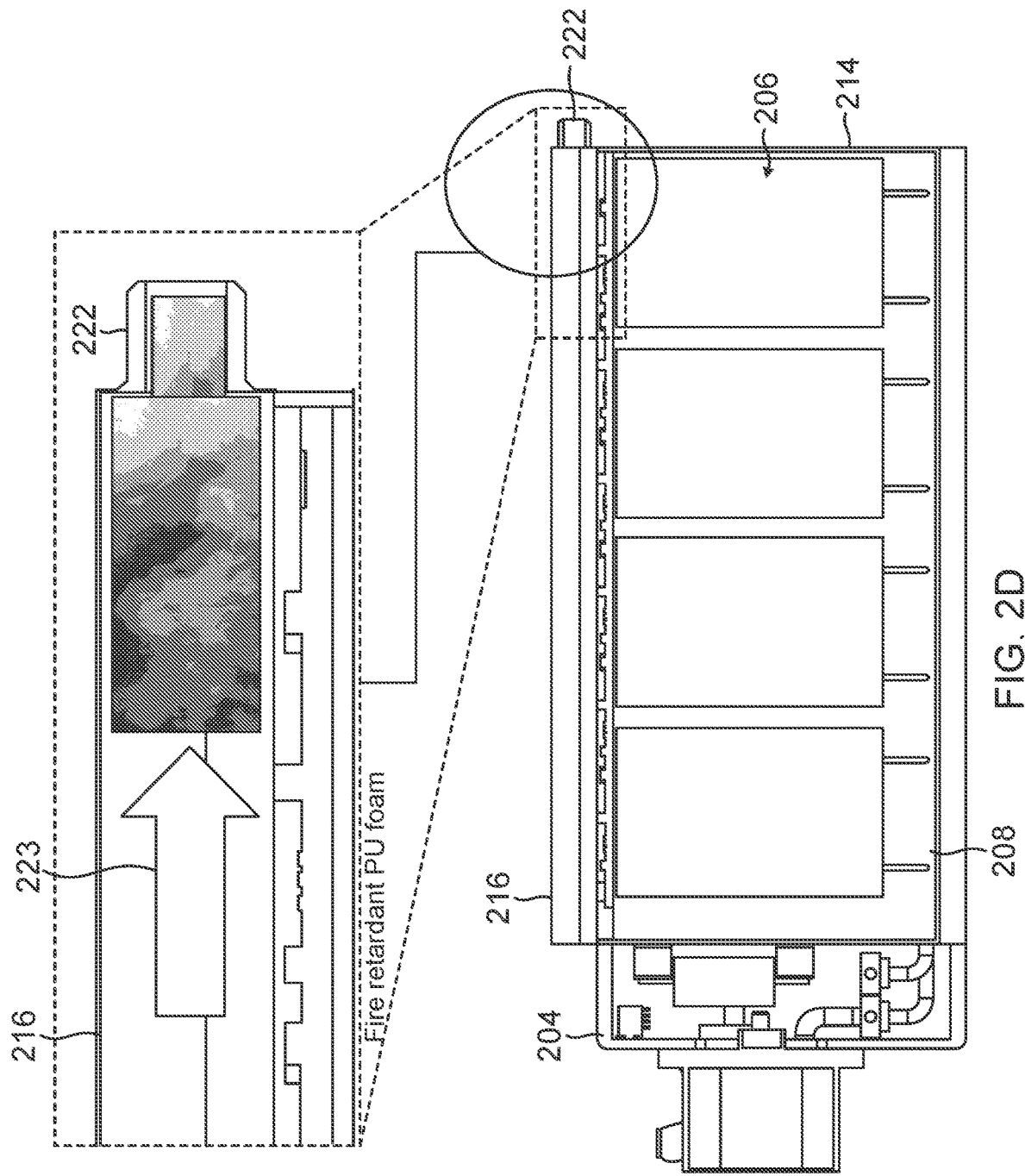

In some examples, casing cover 216 may include a vent 222, e.g., as illustrated in FIG. 2D. In the event of a fire or explosion within housing 202, products of combustion, such as hot gas and smoke, expand and exhaust through vent 222, as indicated by arrow 223. An arc-shaped shape of casing cover 216 may direct the combustion products toward vent 222. The controlled flow of the combustion products may reduce influx of oxygen, thereby slowing or reducing further combustion. This may reduce a burn rate of a fire, result in incomplete combustion, reduce an increase of or maintain a temperature within housing 202, and/or reduce a temperature to which housing 202 (e.g., casing 214 and/or casing cover 216) is exposed, which may reduce a likelihood that housing 202 is breached. In some examples, vent 222 may be coupled to an exhaust manifold configured to vent combustion products away from other aerospace batteries or components near aerospace battery 200.

In some examples, aerospace battery 200 may include optional service compartment 204, e.g., as illustrated in FIGS. 2A and 2D. Service compartment 204 may include one or more features configured to facilitate installation, removal, or servicing of aerospace battery 200. For example, service compartment 204 may include a service disconnect switch, a high voltage connector, a liquid manifold, a sensor connector, or other components. The service disconnect switch may include a manual switch or an automated switch to electrically isolate aerospace battery 200 from other batteries or components. The high voltage connector may include one or more conductors, insulators, and mechanical couplings configured to electrically couple aerospace battery 200 to other batteries or components (e.g., generator 108). The cooling liquid manifold may include one or more mechanical coupling to fluidly couple aerospace battery 200 to a cooling circuit. The sensor connector may include one or more conductors, insulators, and mechanical couplings configured to communicatively coupled aerospace battery 200 to other batteries or components, such as a controller or processing circuitry.

Figure 2E:
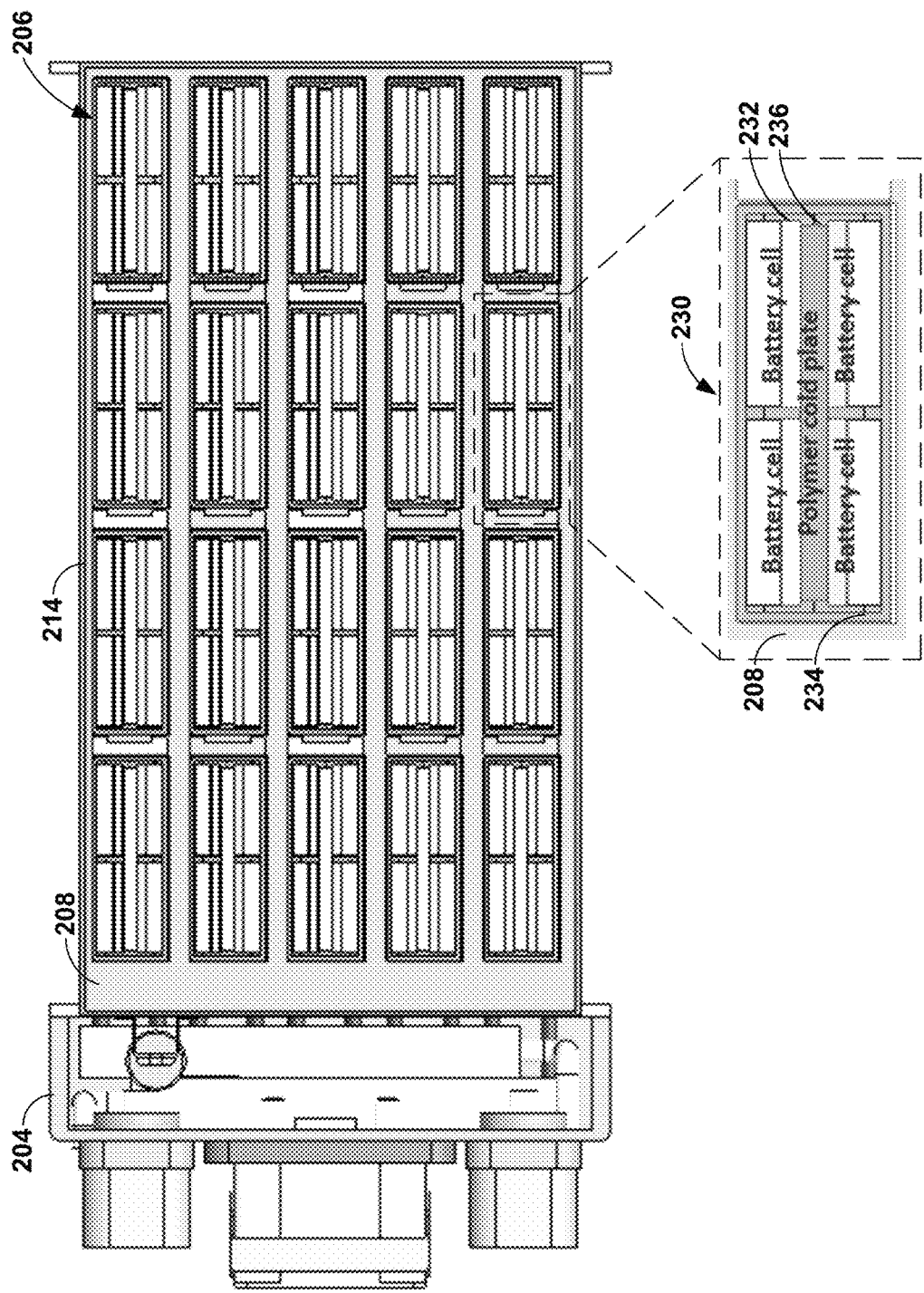

Aerospace battery 200 includes battery pack core 206. Battery pack core 206 includes one or more districts 230. For example, as illustrated in FIG. 2E, battery pack core 206 includes twenty districts. Districts 230 includes a plurality of battery cells 232, e.g., four battery cells 232. In other examples, districts 230 may include fewer battery cells, such as one to three battery cell, or more battery cells, such as fifty battery cells, one hundred battery cells, or more. Battery cells 232 may include any suitable type of primary or secondary battery cell, such as a lithium-ion battery or a nickel-based battery. In some examples, battery cells 232 may include a cylindrical cell or a button cell having a rigid exterior casing. In other examples, battery cells 232 includes a pouch cell having a flexible and lightweight exterior casing (e.g., relative to a cylindrical cell or button cell of similar size and power output).

If battery cell 232 experiences a thermal event, temperatures at the location of the thermal event may reach between 800° C. and 1000° C. To reduce a temperature increase of adjacent districts 230 or battery cells 232, districts 230 may include a ceramic jacket 234. Ceramic jacket 234 may be configured to reduce or substantially eliminate a risk of thermal runaway in one battery cell or district of cells causing a thermal runaway in other adjacent battery cells or districts. In some examples, ceramic jacket 234 may include a ceramic fiber paper including, for example, alumina, silica, alumina-silicate, calcium-magnesium oxide, calcium magnesium silicate, or another ceramic have temperature capability (e.g., thermal stability) to withstand temperatures of a thermal event. In some examples, ceramic jacket 234 may line or completely envelop (or enclose) respective districts 230, except for apertures allowing penetration of cell tabs, cooling liquid lines, or both. In some examples, ceramic jacket 234 may include partitions within districts 230 between adjacent battery cells 232.

Additionally, or alternatively, aerospace battery 200 may include closed cell foam 208. Closed cell foam 208 is disposed in housing 202 such that at least a portion of closed cell foam 208 is between battery pack core 206 and housing 202, between each district of districts 230, or both. Closed cell foam 208 is configured to reduce or substantially eliminate free space within the housing for flammable materials or gases, provide vibration or impact absorption, and/or provide thermal insulation between adjacent districts 230 or districts 230 and housing 202. Although described as a closed cell foam, in other examples, aerospace battery 200 may include one or more additional or different fill materials such as a refractory or ceramic material, ceramic paper, ceramic felt, or the like.

By reducing free space, the amount of combustible gas within housing 202 may be reduced, and an electrolyte that is released by a battery cell within the battery pack core may be contained to a smaller area. Further, closed cell foam 208 and ceramic jacket 234 may limit flow of gas within housing 202, which may reduce provision of oxygen to a fire and reduce the rate of burning. This may also reduce the risk of explosion. In some examples, closed cell foam 208 and ceramic jacket 234 may fill a majority of free space within housing 202 (i.e., volume within housing 202 that is not occupied by battery pack core 206). In some examples, closed cell foam 208 and ceramic jacket 234 may fill at least 75% of the free volume within housing 202.

Further, closed cell foam 208 and ceramic jacket 234 may reduce acceleration of deflagration wavefronts within the internal volume of housing 202. This may reduce the likelihood of deflagration transitioning to detonation. Closed cell foam 208 may be compressible and offer viscous damping of motion of fluid within housing 202. In the event of an off-gas explosion inside housing 202, closed cell foam 208 may compress under pressure, allowing combustion products to expand. Closed cell foam 208 may redistribute localized stress concentration over a larger area of housing 202. Additionally or alternatively, closed cell foam 208 may reduce the rate of rise in pressure exerted on housing 202 in the event of an off-gas explosion inside housing 202.

In some examples, closed cell foam 208 may include a polymer foam, such as a polyurethane foam. Polymer foam may be more resilient (e.g., have a higher facture resistance than a ceramic foam), while still offering relatively low thermal conductivity, temperature withstand capability, and light weight. In some examples, the polymer foam is a closed cell foam, e.g., in which at least some of the pores are not interconnected. This may reduce or substantially eliminate gas or liquid flow through closed cell foam 208. For example, combustion gases resulting from a fire or explosion, or cooling liquid resulting from a ruptured cold plate or coolant line, may be prevented from flowing to other areas of aerospace battery 200.

In some examples, closed cell foam 208 may include a polymer foam filled with a fire retardant material. For example, up to about 15% of the volume of closed cell foam 208 may be filled with fire retardant material. In this way, closed cell foam 208 may resist burning.

In some examples, closed cell foam 208 may include a viscoelastic material configured to bond to housing 202 and ceramic jacket 234. By bonding to housing 202 and ceramic jacket 234, closed cell foam 208 may support districts 230 within housing 202 to reduce vibration transfer from housing 202 to districts 230, protect districts 230 from impact to housing 202, or both.

During operation, e.g., charging or discharging, battery cells 232 may generate heat. To reduce thermal runaway resulting from elevated temperature and improve an efficiency and longevity of battery cells 232, aerospace battery 200 may include one or more cold plates 236. Cold plates 236 are configured to, during operation of battery pack core 206, regulate a temperature of battery cells 232. In examples in which battery cells 232 include pouch cell batteries, cold plates 236 may allow for dimensional changes, such as expansion (e.g., swelling) and contraction, of battery cells 232 during operation. Additionally, in some examples, cold plates 236 may be configured to electrically isolate two or more battery cells.

For example, cold plates 236 may include a flexible, polymer-based pouch defining a cooling channel. The cooling channel may include a serpentine path configured to pass a cooling liquid in thermal contact with battery cells 232. Any suitable material may be used to form cold plates 236, such as polyethylene, polytetrafluoroethylene, or other polymers suitable for use at temperatures within the operating temperature range of battery cells 232. In some examples, the material of cold plates 236 may be selected to have a flexibility that enables one or more adjacent pouch cell batteries to expand. For example, a resistance of a flexible cold plate 236 may be less than a resistance that could result in rupture of an exterior of the pouch cell batteries. Additionally, in some examples, the material of cold plates 236 may be nonconductive to electrically isolate (e.g., insulate) adjacent battery cells 232.

Figure 6B:
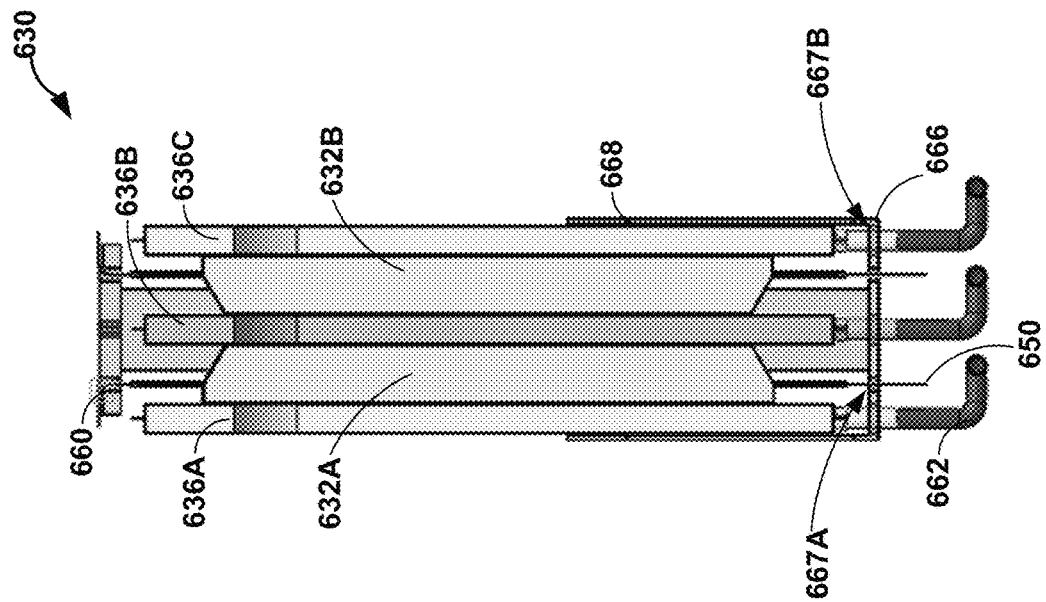
FIGS. 6A and 6B are conceptual diagrams illustrating a perspective view and a cross-sectional view of an example district of a battery pack core.

In a single-sided configuration, such as illustrated in FIG. 2E, cold plates 236 may be dispose between a first battery cell and a second battery cell. In other examples, such as illustrated in FIG. 6B discussed below, cold plates 236 may be arranged in a double-sided configuration. In a double-sided configuration, a first cold plate may be disposed between a first battery cell and a second battery cell, a second cold plate may be disposed adjacent to the first battery cell, opposite the first cold plate, and a third cold plate may be disposed adjacent to the second battery, opposite the first cold plate. A double-sided configuration may enable cooling of batteries with a C-rate of greater than about 10 C, greater than about 30 C, or greater than about 50 C, whereas a single-sided configuration may enable cooling of batteries with a C-rate of less than about 50 C or less than about 30 C, such as about 10 C. As used herein, C-rate is a measure of current at which a battery cell may be charged and discharged.

Each cold plate 236 includes a cooling channel having an inlet and an outlet. In some examples, cold plates 236 may include a plurality of inlets and outlets. The inlets and the outlets may include a coupling configured to fluidly couple the cooling channel to a fluid delivery channel and a fluid return channel, respectively. The inlets and the outlets may be integrally formed with, or mechanically fixed to, the flexible, polymer-based pouch of cold plate 236. The fluid delivery channel and the fluid return channel may be configured to couple (e.g., in series, in parallel, or a combination of both) two or more cold plates 236. Additionally, the fluid delivery channel and the fluid return channel may be configured to fluidly couple to the liquid manifold of service compartment 204 and/or a cooling fluid circuit.

In some examples, battery pack core 206 may include a retaining seat 240. Retaining seat 240 may be configured to support districts 230, individual battery cells 232, and/or individual cold plates 236 in housing 202. For example, retaining seat 240 may include a base and frame members extending from the base. The base may define a plurality of apertures configured to receive therethrough cell tabs of battery cells 323. The frame members may be shaped and positioned to support districts 230, individual battery cells 232, and/or individual cold plates 236. In some examples, retaining seat 240 may be configured to support districts 230, individual battery cells 232, and/or individual cold plates 236 when close cell foam 208 is introduced into housing 202, when close cell foam 208 is curing, or both. In this way, during manufacture of aerospace battery 200, battery pack core 206 may be prepared prior to introducing closed cell foam 208 into housing 202. This may improve control of the position of battery pack core 206 (or components thereof, such as districts 230, battery cells 232, or cold plates 236) during the manufacture of aerospace battery 200.

In some examples, retaining seat 240 may define a fluid delivery channel that is configured to couple to the inlet of the cooling channel of cold plate 236 and a fluid return channel configured to couple to the outlet of the cooling channel of cold plate 236. For example, a base of retaining seat 240 may define a plurality of apertures configured to receive the inlet and the outlet of flexible cold plate 236. In examples in which battery pack core includes a plurality of cold plates 236, retaining seat 240 may include a plurality of apertures configured to receive each respective inlet and each respective outlet of each cold plate 236 of the plurality of cols plates 236.

As illustrated in FIG. 2B, aerospace battery 200 includes a battery management system 242. Battery management system 242 is configured to electrically couple battery cells 232 (e.g., in series, in parallel, or a combination of series and parallel) and may control the operation of battery cells 232. In some examples, battery management system 242 may include a printed circuit board and a busbar. The printed circuit board may include components configured to control the operation of battery cells 232. In some examples, the printed circuit board defines apertures configured to receive therethrough respective cell tabs of each respective battery cell of a plurality of battery cells 232. The busbar is configured to couple with the respective cell tabs. In some examples, the busbar may be integrated with the printed circuit board.

Figures 3A, 3B:
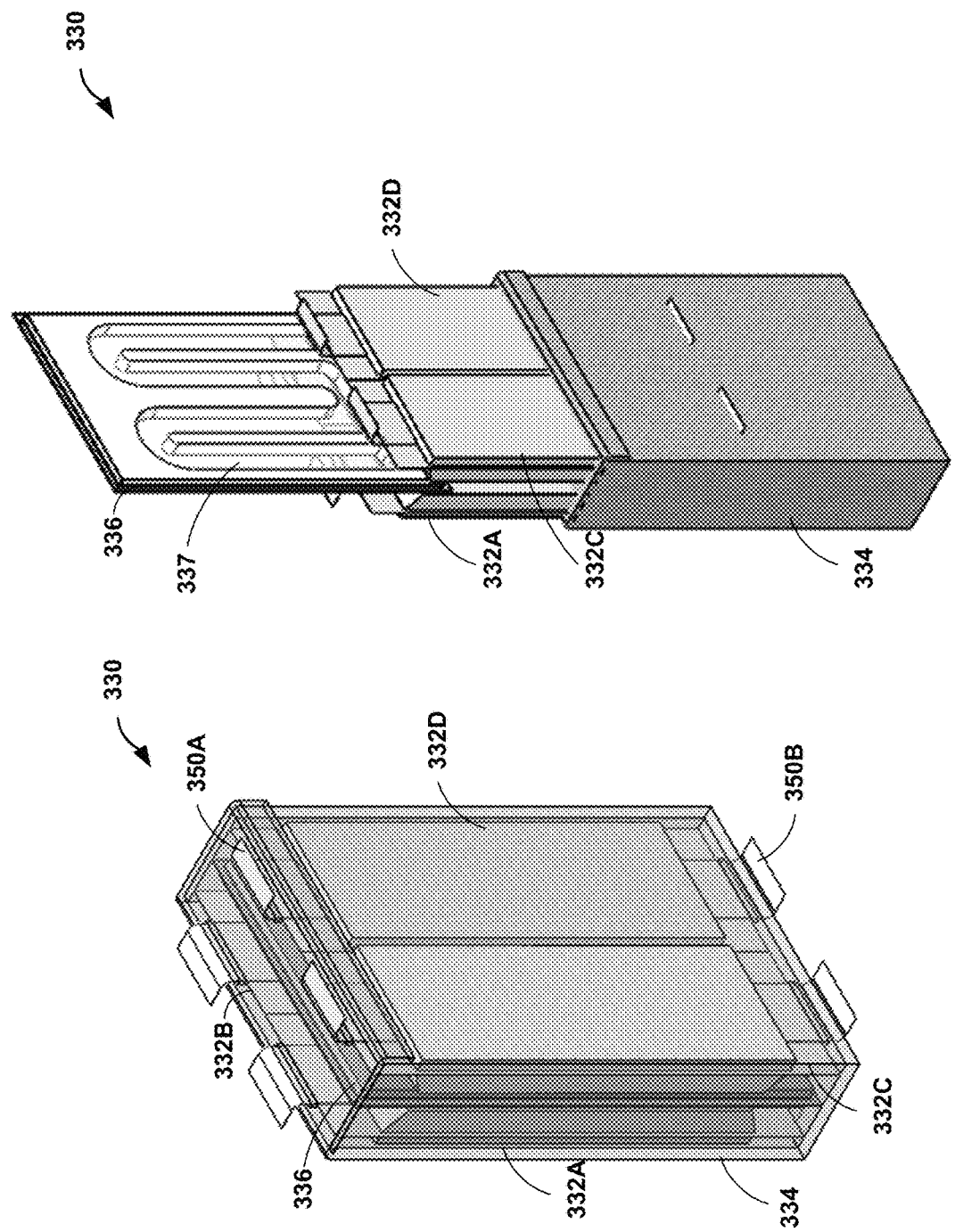
FIGS. 3A and 3B are conceptual diagrams illustrating a phantom view and a partially exploded view of an example district of a battery pack core.

FIGS. 3A and 3B are conceptual diagrams illustrating a phantom view and a partially exploded view of an example district 330 of a battery pack core. District 330 may be the same as or substantially similar to district 230 described above in reference to FIG. 2E, except for the differences described herein. For example, district 330 includes four pouch cell batteries 332A, 332B, 332C, and 332D (collectively, battery cells 332) and a cold plate 336 in a ceramic jacket 334. Each of battery cells 332, cold plate 336, and ceramic jacket may be the same or similar to battery cells 232, cold plate 336, and ceramic jacket 234, respectively, as discussed above.

Each pouch cell battery of battery cells 332 include respective cathode and anode tabs. For example, battery cell 332D includes tabs 350A and 350B (collectively, tabs 350). Tabs 350 are configured to electrically couple battery cells 332 to a battery management system, such as a busbar. Ceramic jacket 334 may line or completely envelop district 330, except for apertures allowing penetration of tabs 350 or, in some examples, an inlet and an outlet of cold plate 336. In this way, ceramic jacket 334 may be configured to reduce or substantially eliminate a risk of thermal runaway in district 330 from causing a thermal runaway in other adjacent battery cells or districts, while enabling tabs 350 to be electrically coupled to a battery management system.

As illustrated in FIGS. 3A and 3B, battery cells 332 and cold plate 336 are arranged in a single-sided configuration. That is, during operation, cold plate 336 may remove heat from a single-side of each cell of battery cells 332. In some examples, cold plate 336 may regulate an operating temperature of battery cells 332 with a C-rate of less than about 50 C or less than about 30 C, such as about 10 C. For example, cooling channel 337 of cold plate 336 may be sized to allow a selected cooling liquid flow rate and have a serpentine shape to provide a selected heat transfer from battery cells 332 to the cooling liquid.

Figure 4:
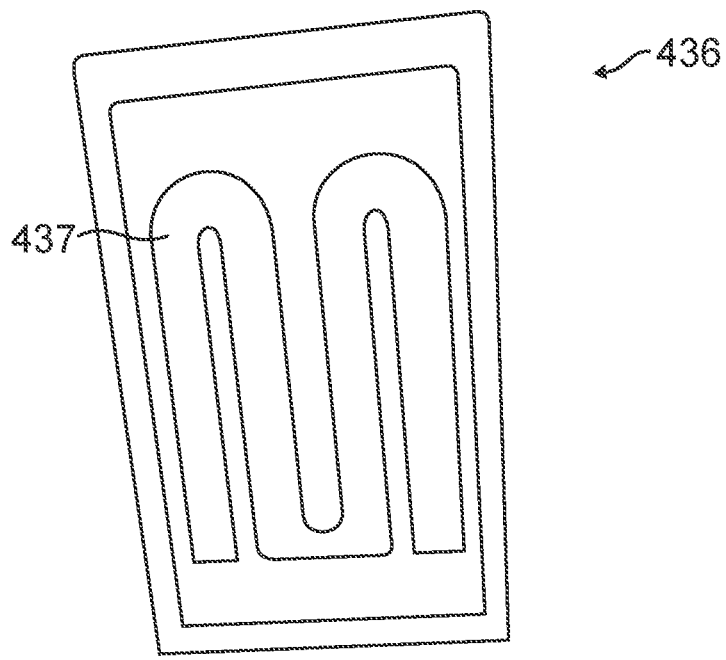
FIGS. 4 and 5 are photographs illustrating example flexible, polymer-based cold plates.

FIG. 4 is a photograph illustrating an example flexible, polymer-based cold plate 436 including a cooling channel 437. Cold plate 436 may be the same or substantially similar to cold plates 236 and/or 336 described above in reference to FIGS. 2A-3B, except for the differences described herein. Cold plate 436 include a thin wall polymer cold plate. For example, a thickness of the polymer walls of cold plate 436 may be within the range from about 0.2 thousands of an inch (mil) to about 2 mil. The density of the polymer and wall thickness of cold plate 436 may have a weight less than a weight of a metal-based cold plate configured to provide the same or substantially similar heat transfer. Cold plate 436 may be formed using any suitable technique. In some examples, two polymer sheets may be adhered or thermally welded together to define cooling channel 437.

Figure 5:
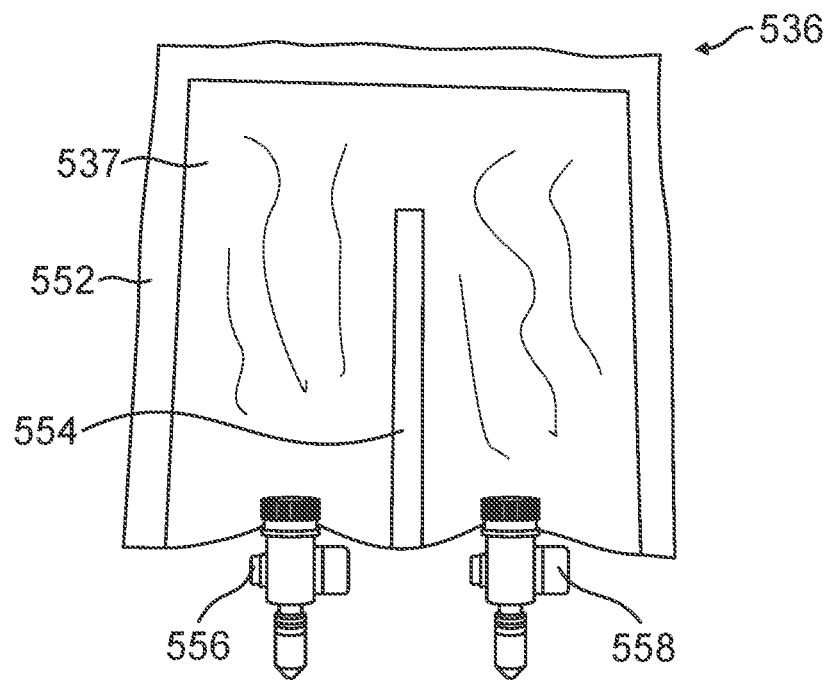

FIG. 5 is a photograph illustrating an example flexible, polymer-based cold plate 536. Cold plate 536 may be the same or substantially similar to cold plates 236, 336, and/or 436 described above in reference to FIGS. 2A-4, except for the differences described herein. Cold plate 536 include two polymer sheets. An outer perimeter 552 of the polymer sheets may be adhered or thermally welded to one another to define a pouch. One or more portions of the pouch may be adhered or thermally welded to form one or more partitions 554 that define a cooling channel 537.

Cold plate 536 also includes an inlet 556 and an outlet 558. Inlet 556 and outlet 558 include couplings having a first end and a second end. The first end may be adhered or thermally welded to the two polymer sheets to fluidly couple a lumen of inlet 556 and outlet 558 to cooling channel 537. The second end may include a mechanical coupling configured to fluidly couple inlet 556 and outlet 558 to a fluid delivery channel and a fluid return channel. In some examples, inlet 556 and outlet 558 may be configured to couple to a fluid delivery channel and a fluid return channel that are defined by a retaining seat.

Figure 6A:
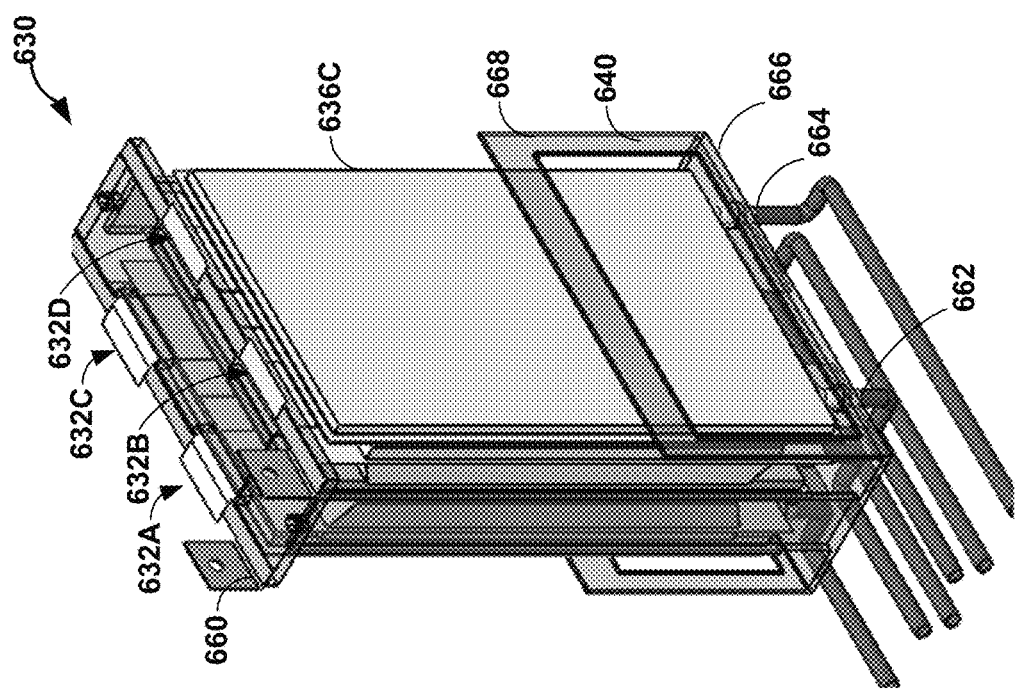

FIGS. 6A and 6B are conceptual diagrams illustrating a perspective view and a cross-sectional view of an example district 630 of a battery pack core. District 630 may be the same or substantially similar to districts 230 and/or 330 described above in reference to FIGS. 2A-3B, except for the differences described herein. For example, district 630 includes four pouch cell batteries 632A, 632B, 632C, and 632D (collectively, battery cells 632) and a cold plates 636A, 636B, and 636C (collectively, cold plates 636).

Battery cells 632 and cold plates 636 are arranged in a double-sided cooling configuration. In a double-sided cooling configuration, cold plate 632B may be disposed between battery cells 632A and 632C and battery cells 632B and 632D, cold plate 636A may be disposed adjacent to battery cells 632A and 632C, opposite cold plate 632B, and cold plate 636C may be disposed adjacent to battery cells 632B and 632D, opposite cold plate 636B. A double-sided cooling configuration may enable temperature regulation of battery cells 632 with a C-rate of greater than about 10 C or greater than about 30 C, such as a C-rate of about 50 C. For example, cold plates 636 may keep a temperature of battery cells 632 with in a safe operating range, such as below about 100° C. or below about 80° C.

District 630 may include retaining seat 640. Retaining seat 640 may be the same as or substantially similar to retaining seat 240 described above in reference to FIGS. 2A-2E except for the differences described herein. Retaining seat 640 may be configured to support battery cells 632 and cold plates 636. For example, retaining seat 640 may include a base 666 and frame members 668 extending from base 666. In some examples, base 666 may define a plurality of apertures (e.g., aperture 667A) configured to receive therethrough cell tabs (e.g., cell tab 650) of battery cells 623. In some examples, base 666 may define a plurality of apertures (e.g., aperture 667B) configured to receive therethrough at least one of an inlet 662 or an outlet 664 of cold plates 636.

Frame members 668 are shaped and positioned to support battery cells 632 and cold plates 636. For example, during manufacture, frame members 668 may retain battery cells 632 and cold plates 636 in a selected orientation relative to one another, facilitate alignment of battery cells 632 (e.g., alignment of cell tab 650 with aperture 667A), or facilitate alignment of cold plates (e.g., alignment of inlet 662 or outlet 664 of cold plates 636 with aperture 667B). In some examples, during operation, retaining seat 640 may allow battery cells 632 to expand or swell. For example, retaining seat 640 may flex or bend in a lateral direction when battery cells 632 expand or swell.

Figure 7A:
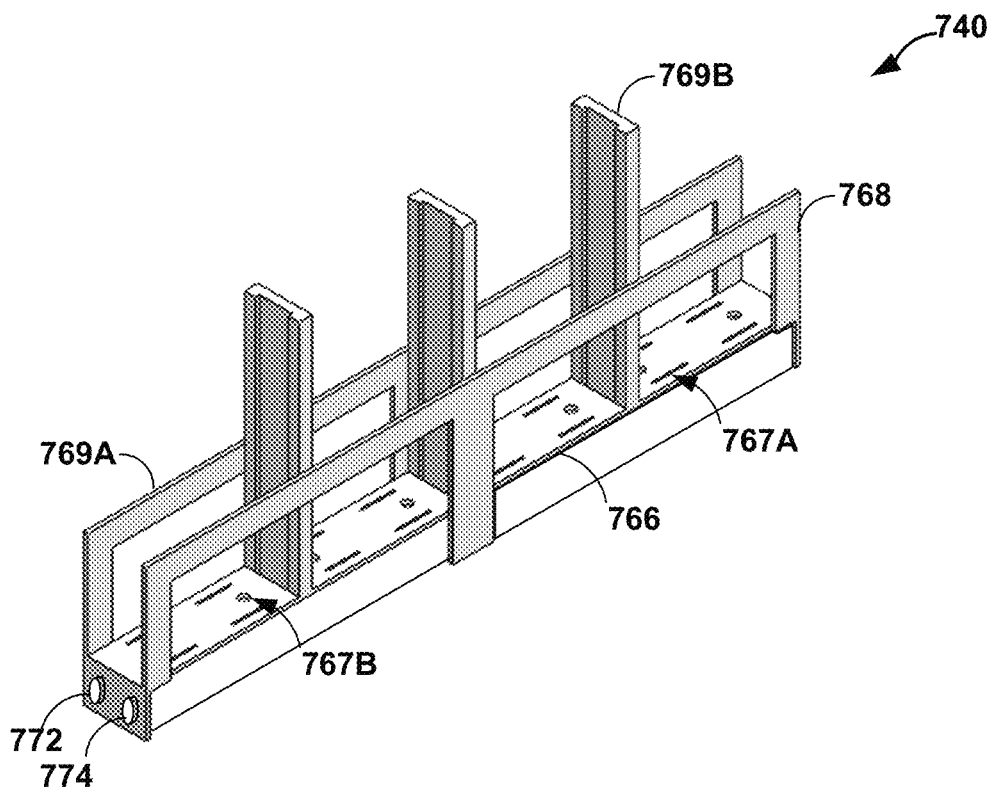
FIGS. 7A and 7B are conceptual diagrams illustrating a perspective view and a cross-sectional view of an example retaining seat of an aerospace battery.
Figure 7B:
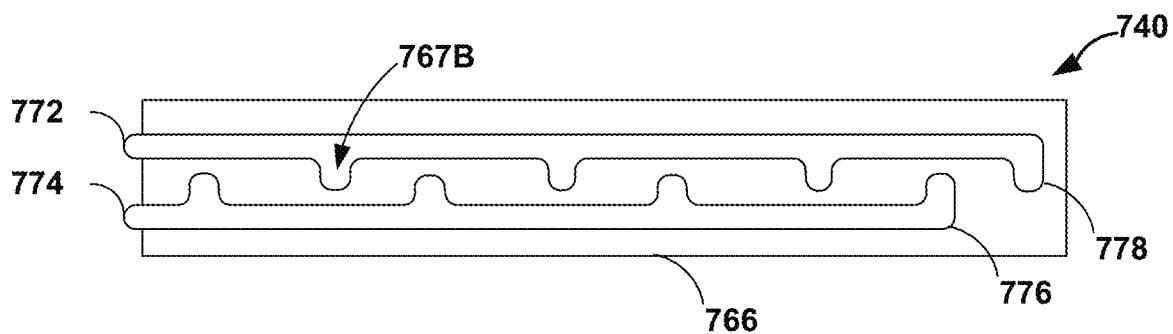

FIGS. 7A and 7B are conceptual diagrams illustrating an example retaining seat 740 of an aerospace battery. Retaining seat 740 may be the same of substantially similar to retaining seats 240 or 640 described above in reference to FIGS. 2A-2E, 6A, and 6B, except for the differences described herein. For example, retaining seat 740 may include a polymer-based material defining base 766 and frame member 768. As illustrated in FIG. 7, retaining seat 740 includes four sections 741A, 741B, 741C, and 741D (collectively, sections 741). Each of sections 741 is configured to support a respective district of a battery pack core. For example, retaining seat 740 may support four districts. In other examples, a retaining seat may be configured to support few districts, such as one to three districts, or more districts, such as 5 or more districts.

In some examples, the polymer-based material of retaining seat 740 may include a fire-retardant material or otherwise resist degradation or burning when exposed to temperatures produced by battery cells undergoing thermal runway reaction. For example, the polymer-based material may include one or more of a polyimide, a polybenzoxazole, a polybenzimidazole, a polybenzthiazole, a ladder polymer, an inorganic or a semiorganic polymer, cyclotriphosphazene, or polysialate. Forming retaining seat 740 from a fire-retardant material may reduce damage to neighboring districts during a thermal event.

In some examples, frame member 768 may be integrally formed with base 766. For example, retaining seat 740 may be injection molded or 3D printed to form both base 766 and frame members 768. In other examples, base 766 and frame members 768 may be separately formed, e.g., by injection molding, 3D printing, or the like, and joined by an adhesive, thermal welding, or another technique suitable for joining polymer-based components.

As illustrated in FIG. 7A, base 766 defines a plurality of apertures including slots (e.g., slot 767A) and holes (e.g., hole 767B). Slots 767A may be shaped to receive therethrough cells tabs of respective battery cells. Holes 767B may be shaped to receive or mechanically couple to inlet and outlets of respective cold plates. In this way, each of the respective battery cells and the respective cold plates may be oriented relative to base 766 and frame members 768. In some examples, the orientation of the respective battery cells and the respective cold plates may provide for thermal contact between the respective battery cells and the respective cold plates, enable swelling or contraction of respective battery cells during operation, or both.

As illustrated in the cross-sectional view in FIG. 7B, base 666 may define a fluid delivery channel 776 and a fluid return channel 778. Fluid delivery channel 776 and fluid return channel 776 may terminate in respective couplings 772 and 774. Couplings 772 and 774 may be configured to couple to a cooling circuit as describe above. In this way, retaining seat 740 may eliminate cooling circuit elements from extending into a respective district, which may simplifying manufacture of an aerospace battery and installation of cold plates into a retaining seat.

Frame members 768 may include lateral rails 769A. Lateral rails 769A may reduce movement of battery cells relative to respective cold plates during formation of a battery pack core, orient battery cells and respective cold plates to provide for thermal contact between battery cells and respective cold plates, or both. In examples in which retaining seat 740 is configured to support a plurality of districts, frame members 768 may include partitions 769B. Partitions 769B may reduce movement of adjacent districts or battery cells relative to respective cold plates during formation of a battery pack core, provide a thermal break between adjacent districts, or both.

Figure 8A:
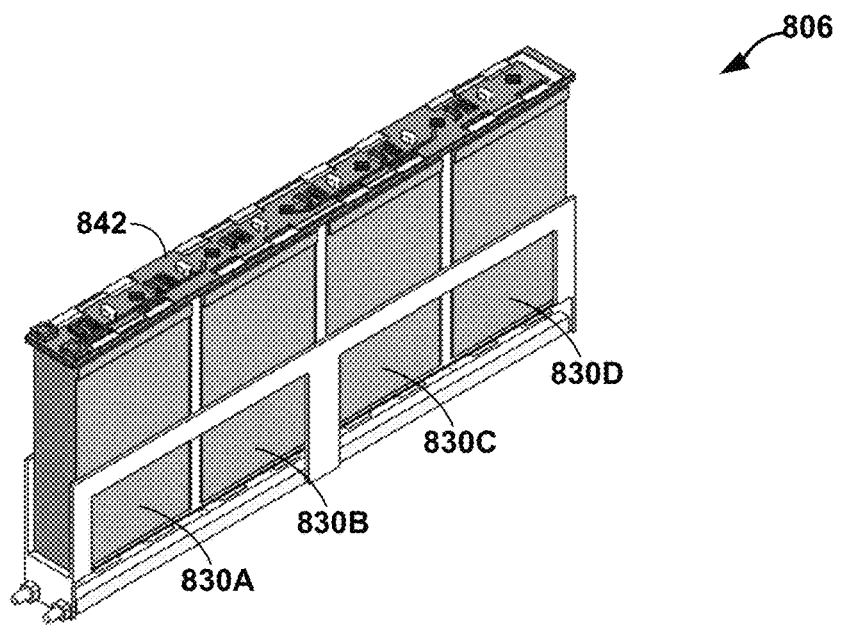
FIGS. 8A-8C are conceptual diagram illustrating various views of an example battery management system of an aerospace battery.
Figure 8B:
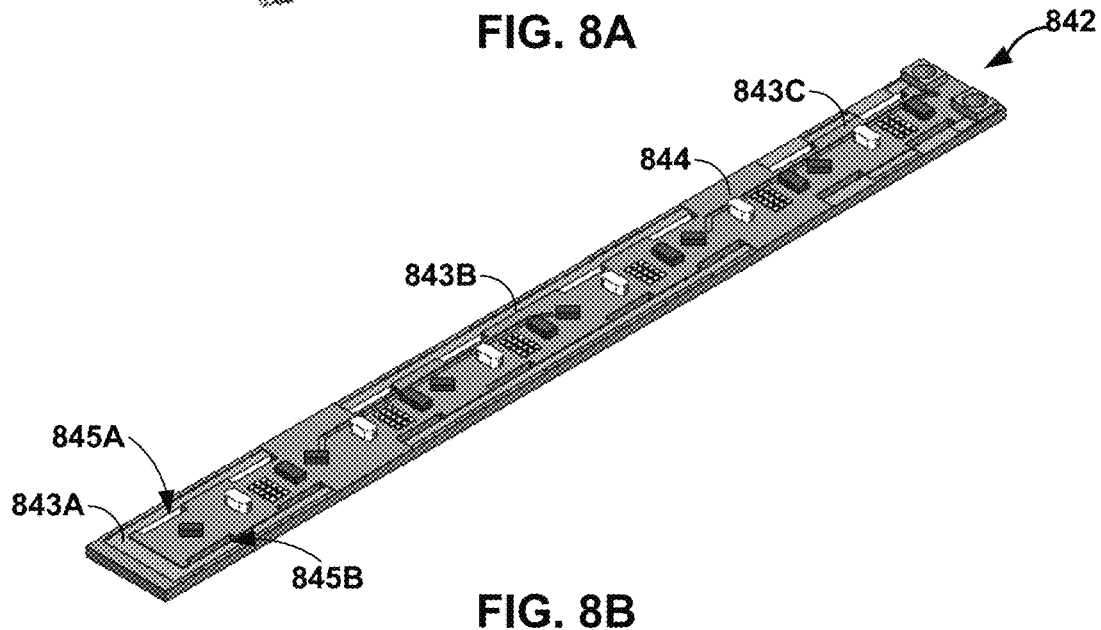
Figure 8C:
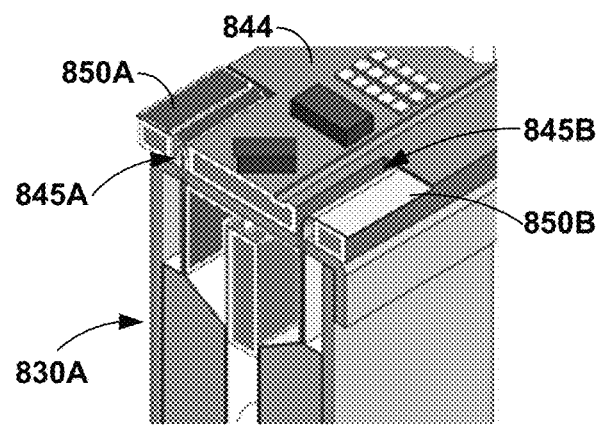

FIGS. 8A-8C are conceptual diagram illustrating various views of an example battery management system 842 of an aerospace battery. Battery management system 842 may be the same as or substantially similar to battery management system 242 described above in reference to FIGS. 2A-2E, except for the differences described herein. For example, battery management system 842 is configured to electrically couple battery cells of districts 830A, 830B, 830C, and 830D of battery pack core 806. Battery management system 842 may include components configured to control discharging and charging of battery cells of battery pack core 806, protect the battery cells from operating outside a safe operating range, monitor a state of the battery cells, monitor and/or communicate data related to the operation of the battery cells, monitor an environment around the battery cells, balance electrical energy of the battery cells, or the like.

In some examples, battery management system 842 electrically couples battery cells of districts 830 in series, in parallel, or a combination of series and parallel via busbars 843A, 843B, 843C, 843D, and 843E (collectively, busbars 843). Series connections may increase an output voltage of a battery pack core 806. Parallel connections may increase an amp-hour capacity of battery pack core 806. In some examples, battery management system 842 may be configured to switch between series or parallel connection between two or more battery cells of battery pack core. The particular electrical connection configuration may be selected based on the electrical characteristics of battery pack core 806, such as the characteristics or number of battery cells and the desired electrical output from battery pack core 806. Generally, battery management system 842 may include any number or arrangement of busbars 843.

In some examples, busbars 843 may be integrated with a printed circuit board 844 of battery management system 842. In other examples, busbars 843 may be separate from printed circuit board 844. Busbars 843 may be formed from any suitable electrically conductive material, such as, for example, gold, a gold alloy, silver, a silver alloy, copper, a copper alloy, aluminum, an aluminum alloy, nickel, a nickel alloy, combinations thereof (e.g., a copper and nickel laminate), or the like.

Printed circuit board 844 may include components configured to control and monitor the operation of battery pack core 806 and, optionally, communicate with external devices, such as computing devices, servers, or network devices. In some examples, printed circuit board 844 defines apertures, e.g., aperture 845A and 845B (collectively, apertures 845). Apertures 845 are configured to receive therethrough respective cell tabs, e.g., cell tabs 850A and 850B (collectively, cell tabs 850), of each respective battery cell of battery pack core 806. In some examples, cell tabs 850 are positioned to extend through respective apertures 845, cell tabs 850 may be bent to interlock with battery management system 842. In this way, apertures 845 may facilitate alignment of each respective battery cell, enable a more robust mechanical coupling of cell tabs 850 to busbars 843, or both.

In some examples, busbars 843 may be integrated with printed circuit board 844. For example, busbars 843 may be formed in or otherwise mechanically affixed to a substrate of printed circuit board 844. Busbar 843 may include a rigid rectangular busbar or a flexible busbar, e.g., a busbar include one or more joints configured to allow at least one movement of cell tabs 850 relative to a surface of printed circuit board 844. Busbar 843 is configured to physically and electrically couple with cell tabs 850. For example, cell tabs 850 may be joined to busbar 843 using one or more of soldering, spot welding, laser welding, ultrasonic welding, mechanical bolt joining, or clinching.

Figure 9:
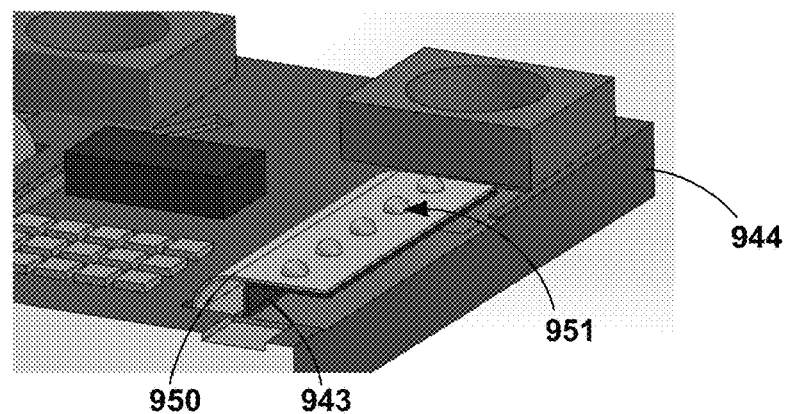
FIGS. 9, 10, and 11 are conceptual diagrams illustrating various cell tab and busbar couplings.
Figure 10:
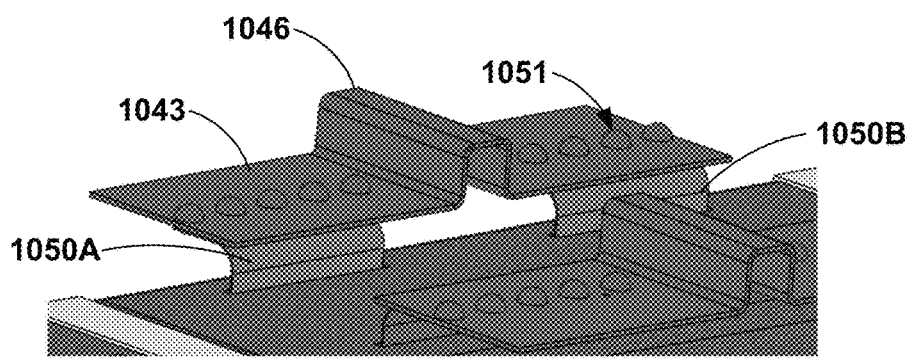
Figure 11:
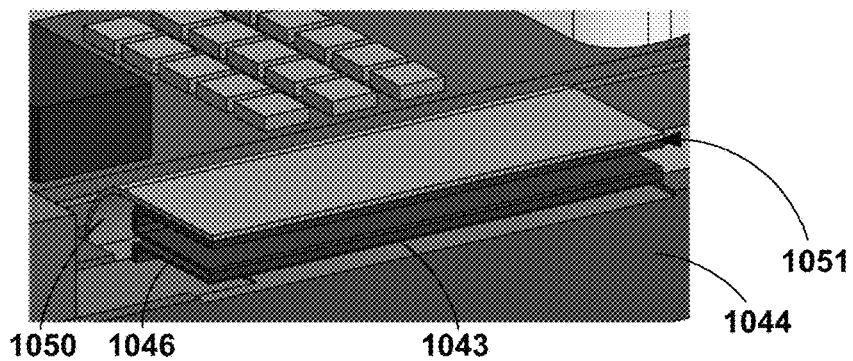

FIGS. 9, 10, and 11 are conceptual diagrams illustrating various cell tab and busbar couplings. For example, FIG. 9 illustrates cell tab 950 that is clinched to busbar 943. In a clinching process, sheet metals and optional intermediate layers, such as adhesives, are joined in a cold forming process for form a clinched region, e.g., clinched region 951. Forming clinched region 951 using a cold process may reduce exposure of the components of printed circuit board 944, battery cells, or the like, to heat that could damage the components or battery cells.

In some examples, a busbar may include one or more flexible regions. For example, FIG. 10 illustrates cell tabs 1050A and 1050B that are clinched to flexible busbar 1043 at clinched region 1051. Flexible busbar 1043 includes a flexible region 1046 configured to allow relative movement between at least two portions of flexible busbar 1043. For example, vibration of an aerospace battery may be transmitted to individual battery cells and cause movement of the battery cells relative to one another. Flexible region 1046 may enable relative movement between cell tabs 1050A and 1050B (e.g., relative movement between two adjacent battery cells). In this way, flexible busbar 1043 may reduce stress at clinched region 1051 of cell tabs 1050A and 1050B and the busbar 1043, relative to a busbar that does not include a flexible joint region. The reduction in stress at clinched region 1051 may reduce mechanical separation of clinch region 1051, thereby increasing the useable life of the aerospace battery.

Additionally, or alternatively, a flexible busbar may be configured to allow relative movement between a cell tab and a printed circuit board. For example, FIG. 11 illustrates cell tab 1150 that is joined to flexible busbar 1143 at joint region 1151. Because flexible busbar 1143 is integrally formed with printed circuit board 1144, flexible joint region 1146 of flexible busbar 1143 may enable relative movement between cell tab 1150 and printed circuit board 1144 (e.g., relative movement between battery cells and printed circuit board 1144). In this way, flexible busbar 1143 may reduce stress at joint region 1151, relative to a busbar that does not include a flexible joint region. The reduction in stress at joint region 1151 may reduce mechanical separation of clinch region 1151, thereby increasing the useable life of the aerospace battery.

Figure 12:
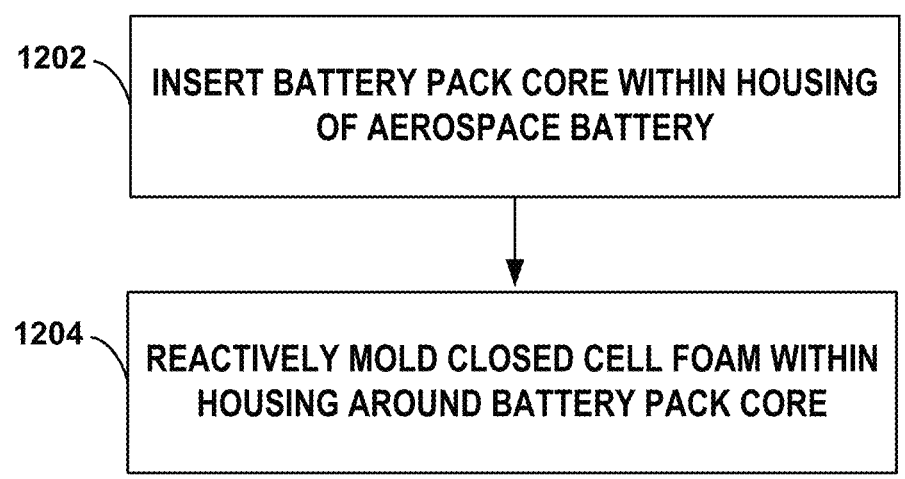
FIG. 12 is an example technique for forming an aerospace battery.

The example aerospace batteries described herein may be formed by any suitable technique. FIG. 12 is an example technique for forming an aerospace battery. The technique of FIG. 12 will be described in reference to aerospace battery 200 illustrated in FIGS. 2A-2E, although it will be understood that the technique of FIG. 12 may be used to form other aerospace batteries and aerospace battery 200 may be formed using other techniques.

The technique of FIG. 12 includes inserting battery pack core 206 within housing 202 of aerospace battery 200

(1202). As discussed above, battery pack core 206 may include one or more districts 230. Each of districts 230 may include battery cells 232, such as a plurality of pouch cell batteries, and ceramic jacket 234 surrounding the district. In some examples, the technique may include forming battery pack core 206. For example, forming battery pack core 206 may include positioning a plurality of battery cells 232 within a respective plurality of ceramic jackets 234 to define a plurality of districts 230. The technique also may include inserting each district of the plurality of districts 230 into a retaining seat 240 to form battery pack core 206.

The technique also may include electrically coupling each battery cell 232, e.g., each pouch cell battery of a plurality of pouch cell batteries, to battery management system 242. For example, battery management system 242 may include a printed circuit board and a busbar integrated with the printed circuit board. The printed circuit board may define apertures configured to receive therethrough respective cell tabs of each respective pouch cell battery. The technique may include aligning the apertures of the printed circuit board with respective cell tabs. The technique also may include coupling the busbar to respective cell tabs by, for example, at least one of soldering, spot welding, laser welding, ultrasonic welding, mechanical bolt joining, or clinching. In some examples, the technique may include, either before or after coupling the busbar to the respective cell tabs, bending the cell tabs to mechanically engage the printed circuit board.

The technique also includes, after inserting battery pack core 206 into housing 202, reactive molding closed cell foam 208 within housing 202 around battery pack core 206 (1204). In some examples, reactive molding closed cell foam 208 within housing 202 may include reactive molding closed cell foam 208 around two or more districts 230. After reactive molding, closed cell foam 208 may fill substantially all the space between housing 202 and battery pack core 206, between districts 230, or both.

In some examples, before inserting battery pack core 206 into housing 202, the technique may include forming housing 202. Forming housing welding at least one sheet of material to form a housing 202. The weld may be a laser welded butt joint, a laser welded interlocking finger joint, a lapped braised joint, or any other suitable joint for joining sheets of material, such as metal sheets.

Figure 13:
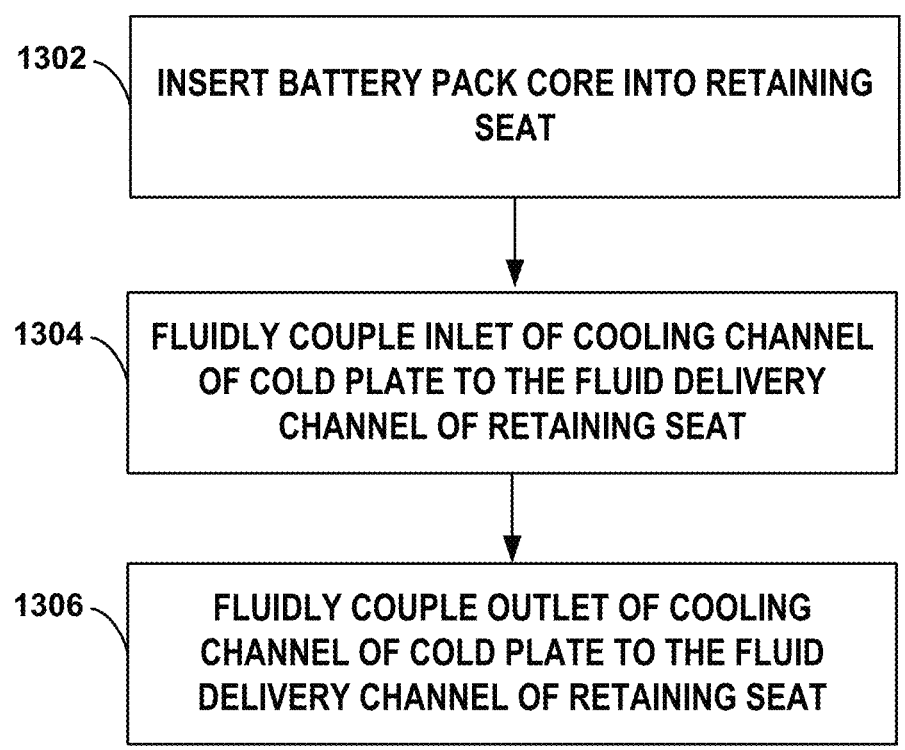
FIG. 13 is an example technique for forming an aerospace battery that includes a retaining seat defining a fluid delivery channel and a fluid return channel.

FIG. 13 is an example technique for forming an aerospace battery that includes a retaining seat defining a fluid delivery channel and a fluid return channel. The technique of FIG. 13 will be described with concurrent reference to FIGS. 2A-2E, although it will be understood that the technique of FIG. 13 may be used to form other aerospace batteries and the aerospace battery 200 may be formed using other techniques.

The technique of FIG. 13 includes inserting battery pack core 206 into retaining seat 240 (1302). As discussed above, retaining seat 240 (e.g., retaining seat 740) may define a fluid delivery channel and a fluid return channel (e.g., fluid delivery channel 776 and fluid return channel 778). Additionally, battery pack core 206 may include one or more districts 230 having battery cells 232 (e.g., a plurality of pouch cell batteries) and cold plate 236 disposed between at least two adjacent battery cells 232, cold plate 236 defining a cooling channel (e.g. cooling channel 537) having an inlet (e.g., inlet 556) and an outlet (e.g., outlet 558).

The technique also includes fluidly coupling the inlet of the cooling channel of cold plate 236 to the fluid delivery channel of retaining seat 240 (1304). The technique also includes fluidly coupling the outlet of the cooling channel of the cold plate 236 to the fluid return channel of retaining seat 240 (1306).

In some examples, the technique may include reactive molding closed cell foam 208 within housing 202 around battery pack core 206. After reactive molding closed cell foam 208, closed cell foam 208 may fill substantially all the space between housing 202 and battery pack core 202, each districts of districts 230, or both.

In some examples, the technique may include positioning a printed circuit board (e.g., printed circuit board 844) on battery pack core 206 such that respective cell tabs (e.g., cell tabs 850) of each respective pouch cell battery of the plurality of pouch cell batteries extend through apertures (e.g., apertures 845) defined by the printed circuit board. The technique also may include electrically coupling the respective cell tabs to a busbar (e.g., busbar 843) integrated with the printed circuit board. For example, electrically coupling the respective cell tabs to the busbar comprises at least one of soldering, spot welding, laser welding, ultrasonic welding, mechanical bolt joining, or clinching.

EXAMPLES

Figure 14A:
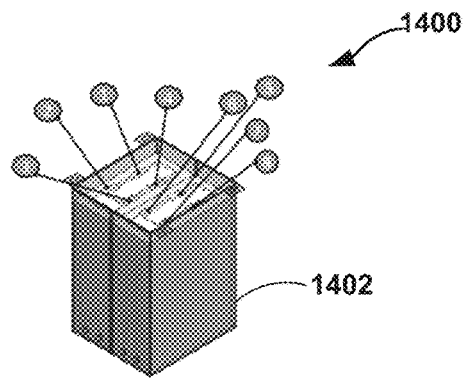
FIGS. 14A-14D are conceptual diagrams illustrating an example aerospace battery 1400 and experimental results of a thermal event.
Figure 14B:
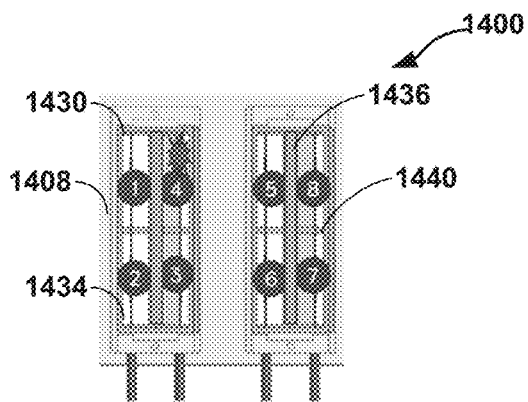

FIGS. 14A-14D are conceptual diagrams illustrating an example aerospace battery 1400 and experimental results of a thermal event. Aerospace battery 1400 was substantially similar as aerospace battery 200 described above. For example, as illustrated in FIG. 14A, aerospace battery 1400 included housing 1402 containing closed cell foam 1408 surrounding two districts 1430. Each district included four pouch cell batteries (e.g., labeled 1 through 8) and a flexible, polymer cold plate 1436, supported by a retaining seat 1440 and surrounded by a ceramic jacket 1434. In this way, the closed cell foam 1408 and ceramic jacket 1434 defined a dual layer fire-thermal barrier between the adjacent districts 1430.

During the experiment, water was passed through flexible, polymer cold plate 1436. A thermal event (e.g., a thermal runaway reaction) was triggered in battery cell 4 using a heating coil positioned near a midpoint along a length of battery cell 4. The heating coil included a nickel-chromium wire having a resistance of about 1.1 Ohm. An electrical current of about 14 volts and 3 amp was passed through the heating coil to increase an internal temperature of battery cell 4. The temperature at the top and the bottom of each battery cell was recorded.

Figure 14C:
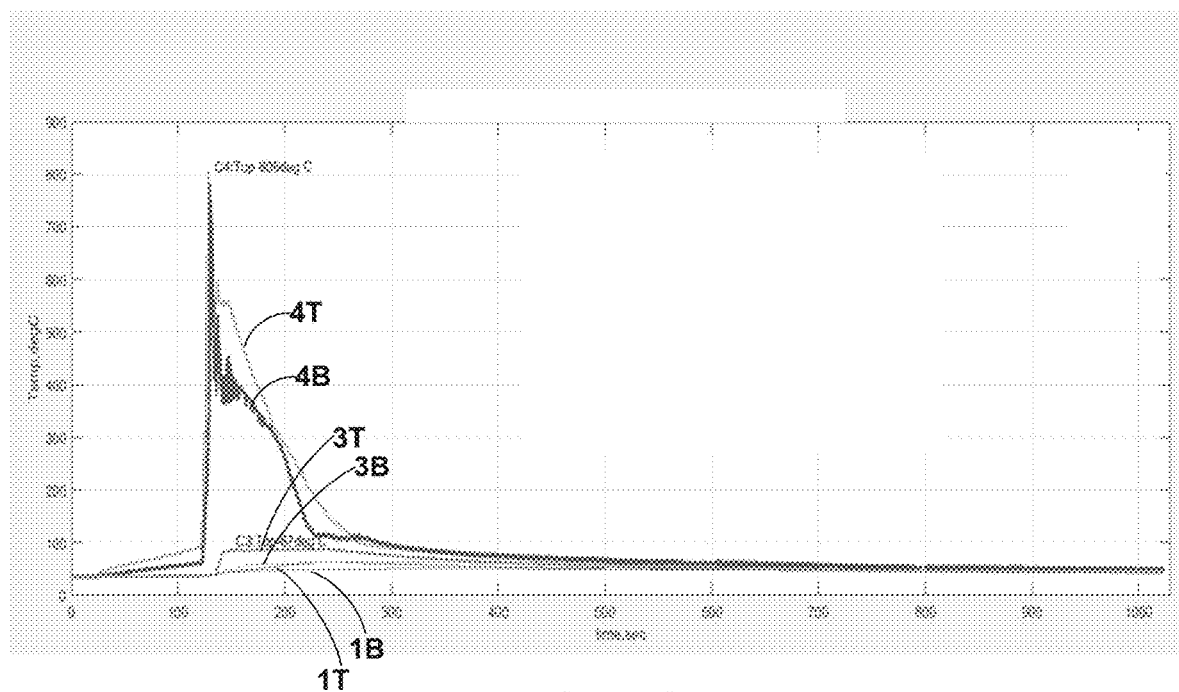
Figure 14D:
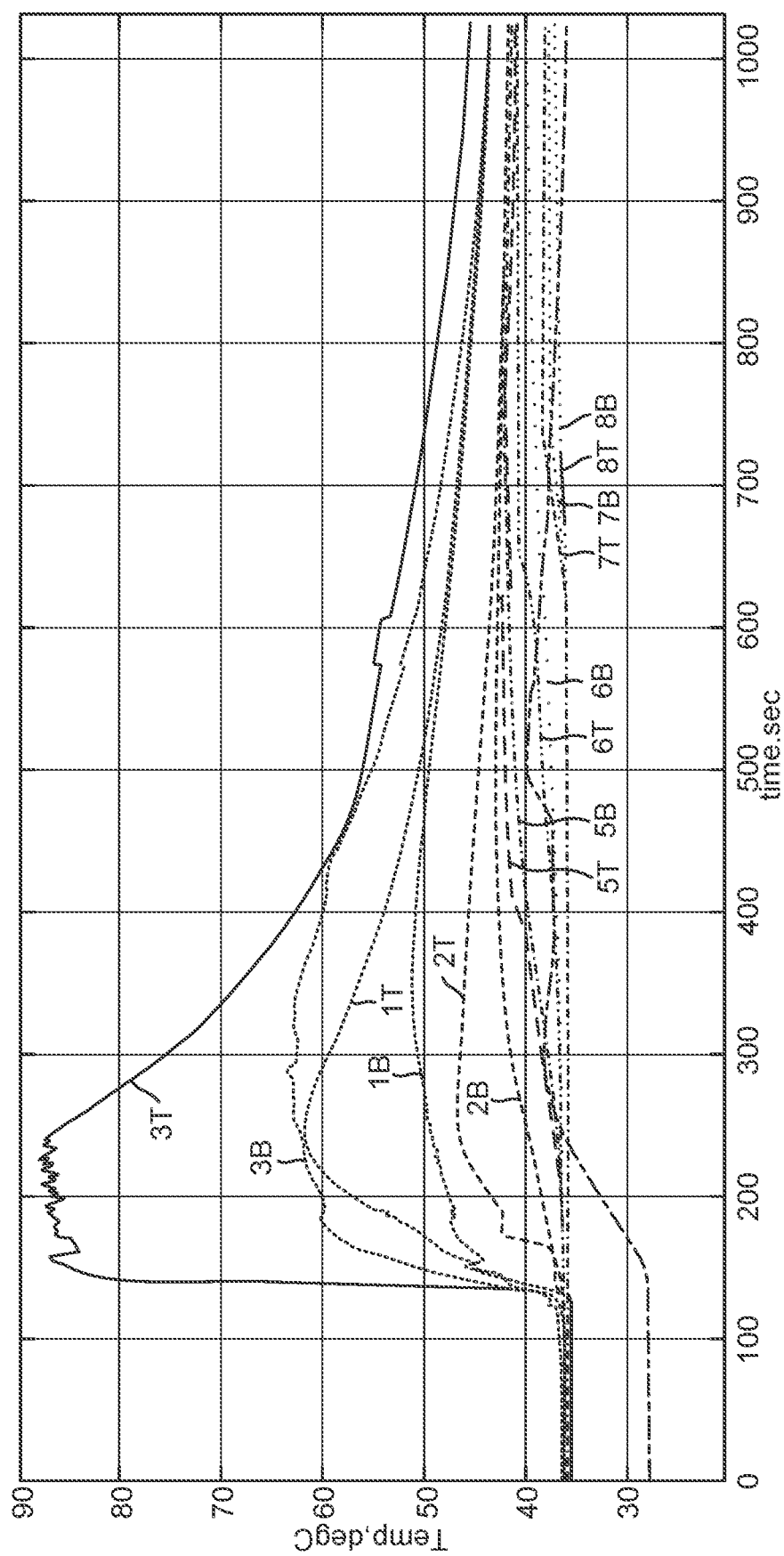

FIGS. 14C and 14D are graphs illustrating temperature (° C.) versus time (seconds) of battery cells 1-8 during the experiment. FIG. 14C illustrates temperatures of the top and bottom of battery cell 4 (e.g., lines 4T and 4B, respectively), as well as temperatures of the top and bottom battery cells 1 and 3 (e.g., lines 1T, 1B, 3T, and 3B) that were directly adjacent to battery cell 4. FIG. 14D illustrates temperatures of the top and bottom of battery cells 1-3 and 5-8 (e.g., lines 1T, 1B, 2T, 2B, 3T, 3B, 5T, 5B, 6T, 6B, 7T, 7B, 8T, and 8B) and a temperature of housing 1402. During the experiment, the temperature at the top and bottom of battery cell 4 climbed to about 806° C. within a time range from about 120 seconds to about 130 seconds and declined thereafter. The top and bottom temperature of battery cell 1, separated from battery cell 4 by flexible cold plate 1436 and battery cell 3, separated from battery cell 4 by a partition of retaining seat 1440, (e.g., lines 3T and 3B, respectively) remained within a safe range below 100° C. For example, the temperature at the top of battery cell 3, as indicated by line 3T, reached a maximum temperature of only 87° C. No flame was generated during the experience, but white smoke was generated. The experimental results show that the dual layer fire-thermal barrier including close cell foam 1408 and ceramic jacket 1434 was able to maintain battery cell temperatures within a safe range (e.g., below 100° C.) and prevent thermal runaway propagation.

Figure 15A:
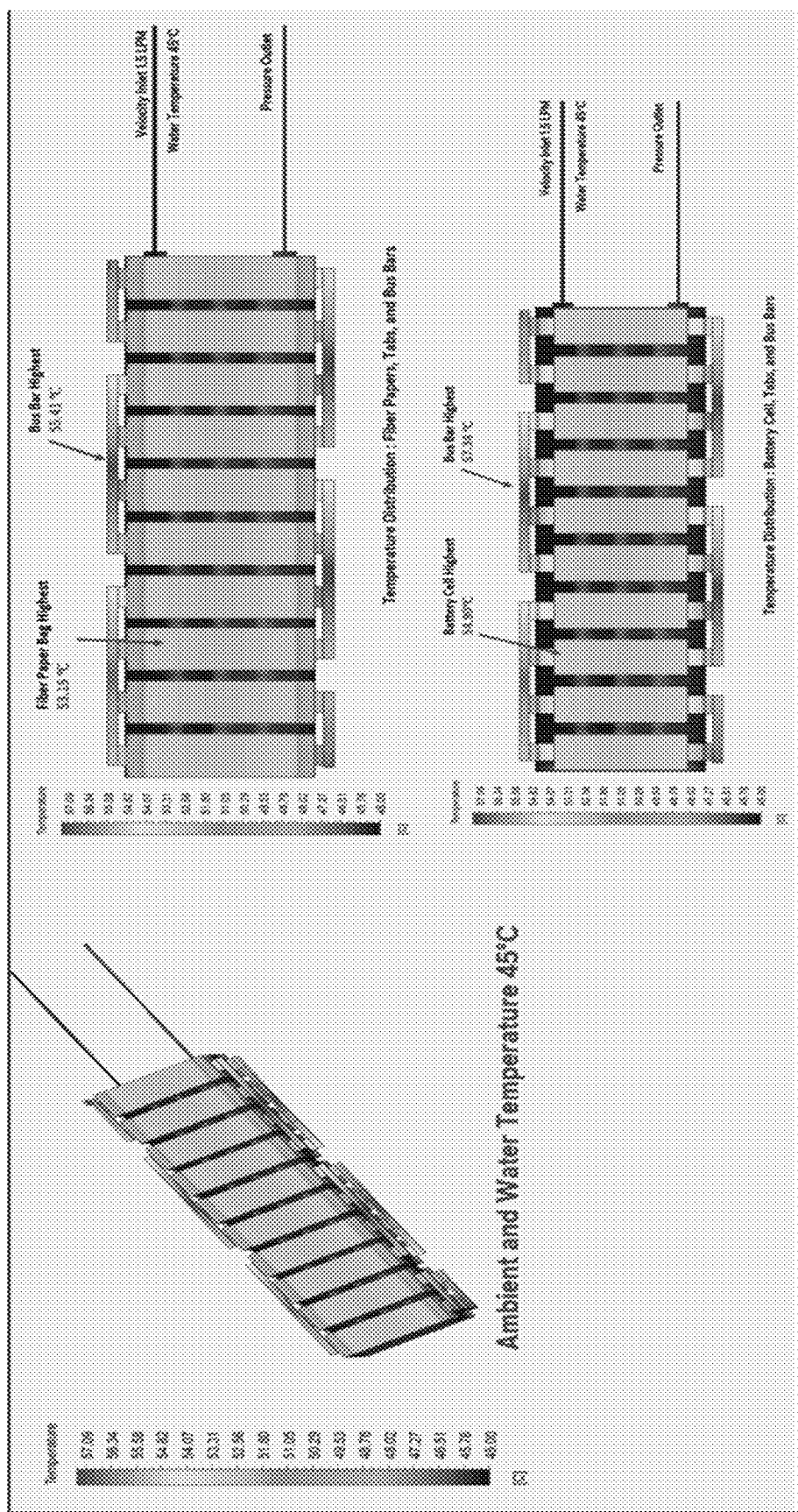
FIGS. 15A-15C are diagrams illustrating thermal cycling simulation (FIG. 15A) and experimental (FIGS. 15B and 15C) results of an example battery pack core.
Figure 15B:
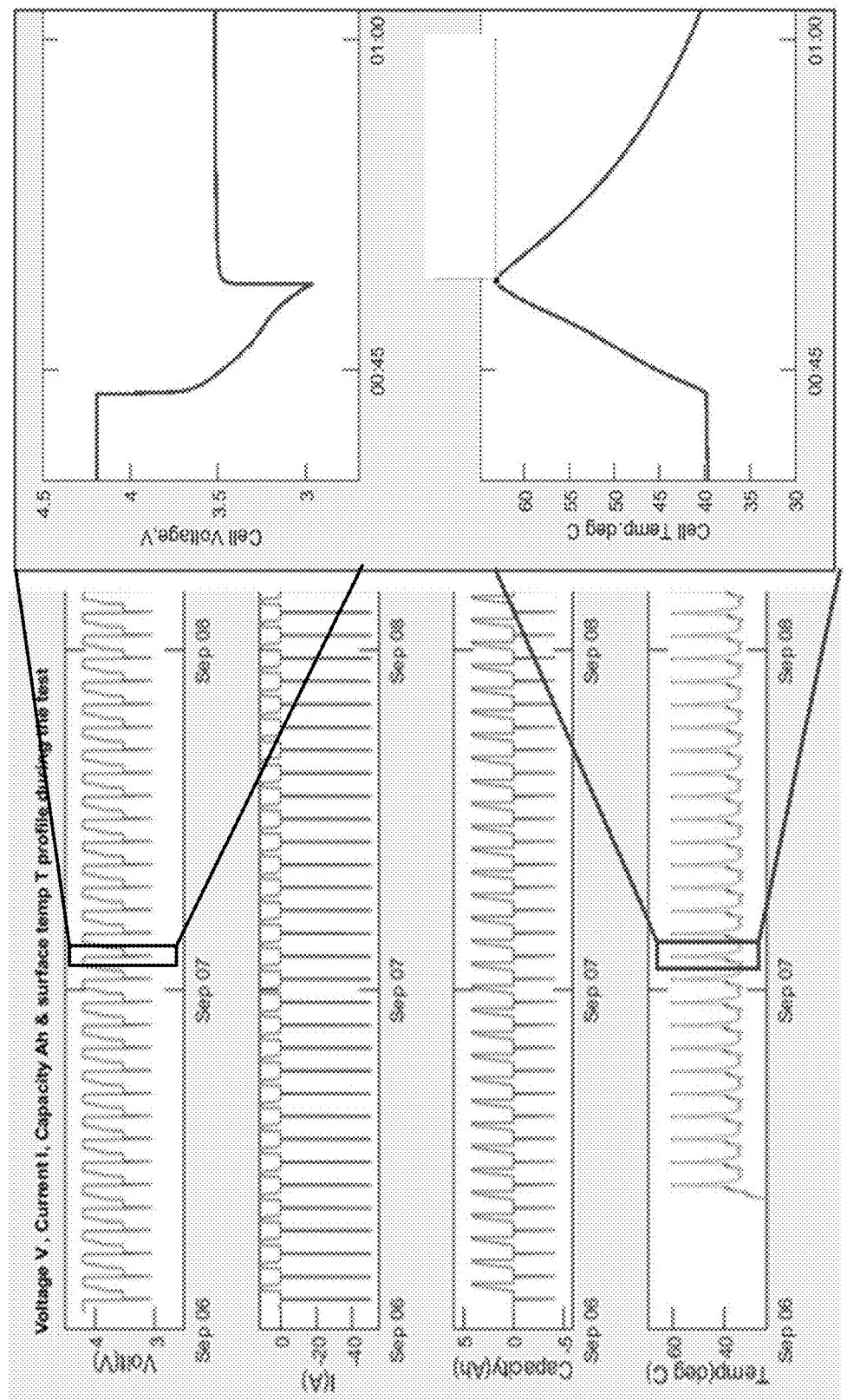

FIGS. 15A and 15B are diagrams illustrating thermal cycling simulation results of an example battery pack core that included twenty pouch cell batteries and a flexible, polymer based cold plate arranged in a single-sided cooling configuration. The ambient temperature and the temperature of the cooling liquid (water) was 45° C. The cooling liquid was input at 1.5 liters per minute. The flexible, polymer-based cold plate included a cooling channel with four passes, each pass extending along the length of the battery core pack. The battery cells were arranged in two rows of ten battery cells. Each battery cell included a 10 C pouch cell battery, which were operated through 729 charge and discharge cycles. Busbars coupled four adjacent battery cells in parallel.

FIG. 15A illustrates thermal imaging maps of the battery pack core. The maximum temperature of the ceramic jacket surrounding the battery cells was 53.15° C. The maximum temperature of the busbars was 57.34° C. The maximum temperature of the battery cells was 54.90° C.

Figure 15C:
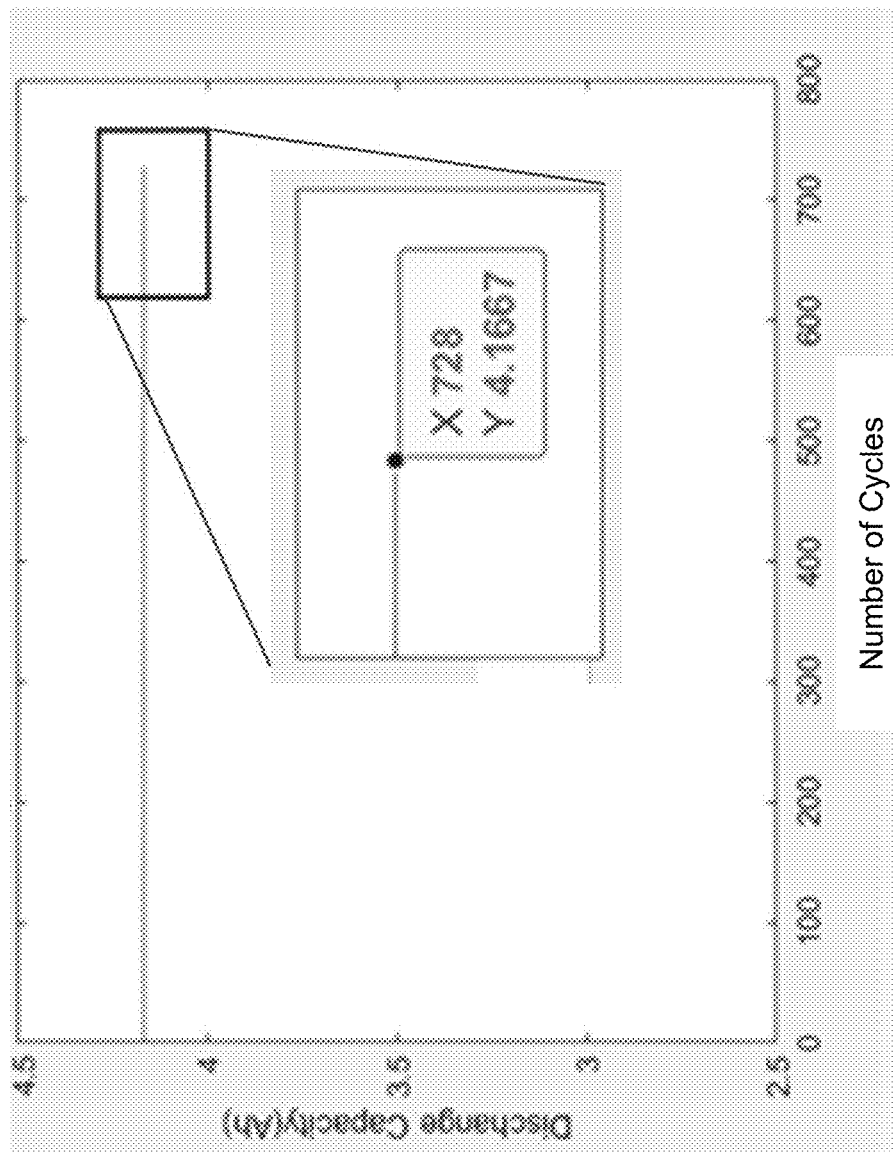

FIG. 15B illustrates graphs of voltage, current, capacity, and temperature versus time, averaged for each battery cell. FIG. 15C illustrates discharge capacity of a selected battery cell over the duration of the experiment. The thermal simulation results show that the flexible, polymer-based cold plate was able to maintain the high-C rate battery cell temperature within a safe range (e.g., below 80° C.). Additionally, the results show that the flexible, polymer-based cold plate was able to minimize the capacity degradation of battery cells during high C rate operation. For example, as illustrated in FIG. 15C, capacity was substantially constant through each cycle.

The following clauses may illustrate one or more aspects of the disclosure:

Clause 1A: An aerospace battery comprising: a housing; a battery pack core disposed in the housing, wherein the battery pack core comprises: a district comprising a plurality of pouch cell batteries; and a ceramic jacket surrounding the district; and a closed cell foam disposed in the housing, wherein at least a portion of the closed cell foam is disposed between the battery pack core and the housing.

Clause 2A: The aerospace battery of clause 1A, wherein the housing comprises: an outer layer comprising at least one of aluminum, an aluminum alloy, a steel alloy, titanium, or a titanium alloy; and an inner layer comprising a ceramic paper.

Clause 3A: The aerospace battery of clause 1A, wherein the housing comprises an arc-shaped casing cover.

Clause 4A: The aerospace battery of clause 3A, wherein the arc-shaped casing cover comprises: an outer layer comprising at least one of aluminum, an aluminum alloy, a steel alloy, titanium, or a titanium alloy; and an inner layer comprising a ceramic paper.

Clause 5A: The aerospace battery of clause 3A, wherein the arc-shaped casing cover defines an aperture configured to vent heat and gases from the housing.

Clause 6A: The aerospace battery of clause 1A, wherein the closed cell foam comprises a fire retardant and a polymer foam.

Clause 7A: The aerospace battery of clause 1A, wherein the closed cell foam comprises a viscoelastic material configured to bond to the housing and the ceramic jacket.

Clause 8A: The aerospace battery of clause 1A, wherein the ceramic jacket comprises an alumina-silicate or a calcium magnesium silicate.

Clause 9A: The aerospace battery of clause 1A, wherein the district comprises a first district of a plurality of districts, each respective district comprising a respective plurality of pouch cell batteries, and wherein the ceramic jacket comprises a first ceramic jacket of a plurality of ceramic jackets, each respective ceramic jacket surrounding a respective district of the plurality of districts.

Clause 10A: The aerospace battery of clause 9A, wherein at least a portion of the closed cell foam is disposed between each adjacent ceramic jacket of the plurality of ceramic jackets and between the plurality of ceramic jackets and the housing.

Clause 11A: The aerospace battery of clause 1A, wherein the battery pack core comprises a retaining seat configured to support the plurality of pouch cell batteries in the housing.

Clause 12A: The aerospace battery of clause 1A, wherein the plurality of pouch cell batteries comprises a first pouch cell battery and a second pouch cell battery, wherein the district further comprises a cold plate dispose between the first pouch cell battery and the second pouch cell battery, wherein the cold plate comprises flexible, polymer pouch defining a cooling channel.

Clause 13A: The aerospace battery of clause 12A, wherein the cold plate is configured to, during operation of the battery pack core, regulate a temperature of the first pouch cell battery and the second pouch cell battery and electrically isolate the first pouch cell battery and the second pouch cell battery.

Clause 14A: The aerospace battery of clause 12A, wherein the cold plate is configured to, during operation of the battery pack core, conform to dimensional changes of the first pouch cell battery and the second pouch cell battery.

Clause 15A: The aerospace battery of clause 12A, wherein the cold plate comprises a first cold plate, wherein the district further comprises: a second cold plate adjacent to the first pouch cell battery, opposite the first cold plate; and a third cold plate adjacent to the second pouch cell battery, opposite the first cold plate.

Clause 16A: The aerospace battery of clause 12A, wherein the battery pack core comprises a retaining seat configured to support the plurality of pouch cell batteries and the cold plate in the housing, wherein the cold plate defines a cooling channel having an inlet and an outlet, and wherein the retaining seat defines a fluid delivery channel configured to couple to the inlet of the cooling channel of the flexible cold plate and a fluid return channel configured to couple to the outlet of the cooling channel of the flexible cold plate.

Clause 17A: The aerospace battery of clause 1A, further comprising a battery management system comprising: a printed circuit board defining apertures configured to receive therethrough respective cell tabs of each respective pouch cell battery of the plurality of pouch cell batteries; and a busbar integrated with the printed circuit board and configured to couple with the respective cell tabs.

Clause 18A: A method comprising: inserting a battery pack core within a housing of an aerospace battery, wherein the battery pack core comprises: a district comprising a plurality of pouch cell batteries; and a ceramic jacket surrounding the district; and reactive molding a closed cell foam within the housing around the battery pack core, wherein the closed cell foam fills substantially all the space between the housing and the battery pack core.

Clause 19A: The method of clause 18A, wherein the district comprises a first district of a plurality of districts, each respective district comprising a respective plurality of pouch cell batteries, wherein the ceramic jacket comprises a first ceramic jacket of a plurality of ceramic jackets, each respective ceramic jacket surrounding a respective district of the plurality of districts, and wherein the method further comprises inserting the plurality of districts into a retaining seat to form the battery pack core.

Clause 20A: The method of clause 18A, wherein the method further comprises electrically coupling each pouch cell battery of the plurality of pouch cell batteries to a battery management system comprising: a printed circuit board defining apertures configured to receive therethrough respective cell tabs of each respective pouch cell battery; and a busbar integrated with the printed circuit board and configured to couple with the respective cell tabs.

Clause 1B: An aerospace battery: a housing; a retaining seat disposed in the housing; a battery pack core supported by the retaining seat, wherein the battery pack core comprises at least one district comprising: a plurality of pouch cell batteries; and a flexible cold plate disposed between at least two adjacent pouch cell batteries of the plurality of pouch cell batteries, wherein the flexible cold plate defines a cooling channel having an inlet and an outlet; wherein the retaining seat defines a fluid delivery channel configured to couple to the inlet of the cooling channel of the flexible cold plate and a fluid return channel configured to couple to the outlet of the cooling channel of the flexible cold plate.

Clause 2B: The aerospace battery of clause 1B, wherein the retaining seat comprises: a base defining a plurality of apertures configured to at least one of receive therethrough at least one of respective cell tabs of each respective pouch cell battery of the plurality of pouch cell batteries or receive the inlet and the outlet of the flexible cold plate; and frame members extending from the base and configured to receive and support the battery pack core.

Clause 3B: The aerospace battery of clause 1B, wherein the retaining seat comprises a low density non-flammable plastic.

Clause 4B: The aerospace battery of clause 1B, wherein the retaining seat comprises a 3D-printed polymer.

Clause 5B: The aerospace battery of clause 1B, wherein the flexible cold plate is configured to, during operation of the battery pack core, regulate a temperature of a first pouch cell battery and a second pouch cell battery of the plurality of pouch cell batteries and electrically isolate the first pouch cell battery and the second pouch cell battery.

Clause 6B: The aerospace battery of clause 1B, wherein the flexible cold plate comprises a first flexible cold plate disposed between a first pouch cell battery and a second pouch cell battery of the plurality of pouch cell batteries, wherein the district further comprises: a second flexible cold plate adjacent to the first pouch cell battery, opposite the first flexible cold plate; and a third flexible cold plate adjacent to the second pouch cell battery, opposite the first flexible cold plate.

Clause 7B: The aerospace battery of clause 1B, wherein the flexible cold plate is configured to, during operation of the battery pack core, conform to dimensional changes of a first pouch cell battery and a second pouch cell battery of the plurality of pouch cell batteries.

Clause 8B: The aerospace battery of clause 1B, further comprising a closed cell foam disposed in the housing, wherein at least a portion of the closed cell foam is disposed between the battery pack core and the housing.

Clause 9B: The aerospace battery of clause 8B, wherein the closed cell foam comprises a fire retardant and a polymer foam.

Clause 10B: The aerospace battery of clause 1B, further comprising a ceramic jacket surrounding the at least one district.

Clause 11B: The aerospace battery of clause 1B, wherein the housing comprises: an outer layer comprising at least one of aluminum, an aluminum alloy, a steel alloy, titanium, or a titanium alloy; and an inner layer comprising a ceramic paper.

Clause 12B: An aerospace battery, comprising: a housing; a plurality of retaining seats disposed in the housing; a plurality of battery pack cores, each supported by a respective retaining seat, wherein each battery pack core comprises a plurality of districts, each comprising: a plurality of pouch cell batteries; and a flexible cold plate disposed between at least two adjacent pouch cell batteries of the plurality of pouch cell batteries, wherein the flexible cold plate defines a cooling channel having an inlet and an outlet; wherein each retaining seat defines a fluid delivery channel configured to couple to the inlet of the cooling channel of the flexible cold plate and a fluid return channel configured to couple to the outlet of the cooling channel of the flexible cold plate.

Clause 13B: The aerospace battery of clause 12B, further comprising a cooling manifold fluidly coupled to the fluid delivery channel and the fluid return channel of each respective retaining seat.

Clause 14B: The aerospace battery of clause 12B, further comprising a battery management system configured to electrically couple the plurality of pouch cell batteries of each respective district of a respective battery pack core in series.

Clause 15B: The aerospace battery of clause 14B, wherein the battery management system comprises: a printed circuit board defining apertures configured to receive therethrough respective cell tabs of each respective pouch cell battery of the plurality of pouch cell batteries; and a busbar integrated with the printed circuit board and configured to couple with the respective cell tabs.

Clause 16B: The aerospace battery of clause 15B, wherein the busbar comprises a flexible busbar.

Clause 17B: A method comprising: inserting a battery pack core into a retaining seat, wherein the retaining seat defines a fluid delivery channel and a fluid return channel, and wherein the battery pack core comprises at least one district comprising: a plurality of pouch cell batteries; and a flexible cold plate disposed between at least two adjacent pouch cell batteries of the plurality of pouch cell batteries, wherein the flexible cold plate defines a cooling channel having an inlet and an outlet, and fluidly coupling the inlet of the cooling channel of the flexible cold plate to the fluid delivery channel of the retaining seat; and fluidly coupling the outlet of the cooling channel of the flexible cold plate to the fluid return channel of the retaining seat.

Clause 18B: The method of clause 17B, wherein the method further comprises reactive molding a closed cell foam within the housing around the battery pack core, wherein the closed cell foam fills substantially all the space between the housing and the battery pack core.

Clause 19B: The method of clause 17B, wherein the method further comprises: positioning a printed circuit board on the battery pack core such that respective cell tabs of each respective pouch cell battery of the plurality of pouch cell batteries extend through apertures defined by the printed circuit board; and electrically coupling the respective cell tabs to a busbar integrated with the printed circuit board.

Clause 20B: The method of clause 19B, wherein electrically coupling the respective cell tabs to the busbar comprises at least one of soldering, spot welding, laser welding, ultrasonic welding, mechanical bolt joining, or clinching.

Various examples have been described. These and other examples are within the scope of the following claims.

What is claimed is:

1. An aerospace battery comprising:
   a housing;
   a retaining seat disposed in the housing;
   a battery pack core supported by the retaining seat, wherein the battery pack core comprises at least one district comprising:
      a plurality of pouch cell batteries; and
      a flexible cold plate disposed between at least two adjacent pouch cell batteries of the plurality of pouch cell batteries, wherein the flexible cold plate defines a cooling channel having an inlet and an outlet;
   wherein the retaining seat defines a fluid delivery channel configured to couple to the inlet of the cooling channel of the flexible cold plate and a fluid return channel configured to couple to the outlet of the cooling channel of the flexible cold plate.

2. The aerospace battery of claim 1, wherein the retaining seat comprises:
   a base defining a plurality of apertures configured to at least one of receive therethrough at least one of respective cell tabs of each respective pouch cell battery of the plurality of pouch cell batteries or receive the inlet and the outlet of the flexible cold plate; and
   frame members extending from the base and configured to receive and support the battery pack core.

3. The aerospace battery of claim 1, wherein the retaining seat comprises a non-flammable plastic including one or more of a polyimide, a polybenzoxazole, a polybenzimidazole, a polybenzthiazole, a ladder polymer, an inorganic or a semiorganic polymer, cyclotriphosphazene, or polysialate.

4. The aerospace battery of claim 1, wherein the retaining seat comprises a 3D-printed polymer.

5. The aerospace battery of claim 1, wherein the flexible cold plate is configured to, during operation of the battery pack core, regulate a temperature of a first pouch cell battery and a second pouch cell battery of the plurality of pouch cell batteries and electrically isolate the first pouch cell battery and the second pouch cell battery.

6. The aerospace battery of claim 1, wherein the flexible cold plate comprises a first flexible cold plate disposed between a first pouch cell battery and a second pouch cell battery of the plurality of pouch cell batteries, wherein the district further comprises:
   a second flexible cold plate adjacent to the first pouch cell battery, opposite the first flexible cold plate; and
   a third flexible cold plate adjacent to the second pouch cell battery, opposite the first flexible cold plate.

7. The aerospace battery of claim 1, wherein the flexible cold plate is configured to, during operation of the battery pack core, conform to dimensional changes of a first pouch cell battery and a second pouch cell battery of the plurality of pouch cell batteries.

8. The aerospace battery of claim 1, further comprising a closed cell foam disposed in the housing, wherein at least a portion of the closed cell foam is disposed between the battery pack core and the housing.

9. The aerospace battery of claim 8, wherein the closed cell foam comprises a fire retardant and a polymer foam.

10. The aerospace battery of claim 1, further comprising a ceramic jacket surrounding the at least one district.

11. The aerospace battery of claim 1, wherein the housing comprises:
    an outer layer comprising at least one of aluminum, an aluminum alloy, a steel alloy, titanium, or a titanium alloy; and
    an inner layer comprising a ceramic paper.

12. An aerospace battery, comprising:
    a housing;
    a plurality of retaining seats disposed in the housing;
    a plurality of battery pack cores, each supported by a respective retaining seat, wherein each battery pack core comprises a plurality of districts, each comprising:
       a plurality of pouch cell batteries; and
       a flexible cold plate disposed between at least two adjacent pouch cell batteries of the plurality of pouch cell batteries, wherein the flexible cold plate defines a cooling channel having an inlet and an outlet;
    wherein each retaining seat defines a fluid delivery channel configured to couple to the inlet of the cooling channel of the flexible cold plate and a fluid return channel configured to couple to the outlet of the cooling channel of the flexible cold plate.

13. The aerospace battery of claim 12, further comprising a cooling manifold fluidly coupled to the fluid delivery channel and the fluid return channel of each respective retaining seat.

14. The aerospace battery of claim 12, further comprising a battery management system configured to electrically couple the plurality of pouch cell batteries of each respective district of a respective battery pack core in series.

15. The aerospace battery of claim 14, wherein the battery management system comprises:
    a printed circuit board defining apertures configured to receive therethrough respective cell tabs of each respective pouch cell battery of the plurality of pouch cell batteries; and
    a busbar integrated with the printed circuit board and configured to couple with the respective cell tabs.

16. The aerospace battery of claim 15, wherein the busbar comprises a flexible busbar.

17. A method comprising:
    inserting a battery pack core into a retaining seat, wherein the retaining seat defines a fluid delivery channel and a fluid return channel, and wherein the battery pack core comprises at least one district comprising:
       a plurality of pouch cell batteries; and
       a flexible cold plate disposed between at least two adjacent pouch cell batteries of the plurality of pouch cell batteries, wherein the flexible cold plate defines a cooling channel having an inlet and an outlet, and;
    fluidly coupling the inlet of the cooling channel of the flexible cold plate to the fluid delivery channel of the retaining seat; and
    fluidly coupling the outlet of the cooling channel of the flexible cold plate to the fluid return channel of the retaining seat.

18. The method of claim 17, wherein the method further comprises reactive molding a closed cell foam within the housing around the battery pack core, wherein the closed cell foam fills substantially all the space between the housing and the battery pack core.

19. The method of claim 17, wherein the method further comprises:
    positioning a printed circuit board on the battery pack core such that respective cell tabs of each respective pouch cell battery of the plurality of pouch cell batteries extend through apertures defined by the printed circuit board; and electrically coupling the respective cell tabs to a busbar integrated with the printed circuit board.

20. The method of claim 19, wherein electrically coupling the respective cell tabs to the busbar comprises at least one of soldering, spot welding, laser welding, ultrasonic welding, mechanical bolt joining, or clinching.

\* \* \* \* \*